US011432312B2

(12) United States Patent
Gupta et al.

(10) Patent No.: US 11,432,312 B2
(45) Date of Patent: Aug. 30, 2022

(54) UPLINK SCHEDULING TECHNIQUES FOR ENHANCED FEEDBACK IN WIRELESS COMMUNICATIONS

(71) Applicant: QUALCOMM Incorporated, San Diego, CA (US)

(72) Inventors: Piyush Gupta, Bridgewater, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 16/855,793

(22) Filed: Apr. 22, 2020

(65) Prior Publication Data

US 2020/0344779 A1 Oct. 29, 2020

Related U.S. Application Data

(60) Provisional application No. 62/839,373, filed on Apr. 26, 2019.

(51) Int. Cl.
*H04W 4/00* (2018.01)
*H04W 72/12* (2009.01)
*H04W 72/04* (2009.01)

(52) U.S. Cl.
CPC ..... *H04W 72/1268* (2013.01); *H04W 72/042* (2013.01); *H04W 72/1257* (2013.01); *H04W 72/1289* (2013.01)

(58) Field of Classification Search
USPC .................................. 370/328, 329, 330, 331
See application file for complete search history.

(56) References Cited

U.S. PATENT DOCUMENTS 10,187,180 B2 * 1/2019 Sorrentino ............ H04L 1/0031
2014/0092824 A1 * 4/2014 He ........................... H04B 5/00
370/329
(Continued)

FOREIGN PATENT DOCUMENTS

WO  WO-2011046355 A3 * 10/2011 ........... H04B 7/0452
WO  WO-2014157996 A1 * 10/2014 ............... H04L 1/00
(Continued)

OTHER PUBLICATIONS

Partial International Search Report—PCT/US2020/029495—ISAEPO—dated Jul. 17, 2020.
(Continued)

*Primary Examiner* — David Q Nguyen
(74) *Attorney, Agent, or Firm* — Holland & Hart LLP

(57) ABSTRACT

Methods, systems, and devices for wireless communications are described for efficient allocation of feedback resources and transmission of feedback for low latency communications. A first user equipment (UE) may be allocated uplink resources for uplink transmissions having one or more gaps during which a second UE may transmit feedback information to initiate a retransmission within specified time limits to achieve desired quality of service (QoS) targets. The one or more gaps may be provided through a downlink control information message that indicates uplink resources to the first UE based on a first starting transmission symbol and a first length indicator, and a second starting transmission symbol and a second length indicator. The one or more gaps may be additionally or alternatively provided through one or more reserved symbols, and the first UE may skip uplink transmissions in one or more reserved symbols.

16 Claims, 24 Drawing Sheets

(56) References Cited

U.S. PATENT DOCUMENTS

| | | | |
|---|---|---|---|
| 2016/0302176 A1* | 10/2016 | Ahn | H04L 1/1896 |
| 2016/0345206 A1* | 11/2016 | Yerramalli | H04W 72/042 |
| 2018/0083758 A1 | 3/2018 | Islam et al. | |
| 2018/0199334 A1 | 7/2018 | Ying et al. | |
| 2018/0279298 A1 | 9/2018 | Wang et al. | |
| 2018/0324816 A1 | 11/2018 | Islam et al. | |
| 2019/0149365 A1* | 5/2019 | Chatterjee | H04L 25/0226 370/329 |
| 2020/0037314 A1 | 1/2020 | Xiong et al. | |
| 2020/0059327 A1 | 2/2020 | Kini et al. | |
| 2021/0022015 A1* | 1/2021 | Oh | H04W 56/001 |

FOREIGN PATENT DOCUMENTS

| | | | | |
|---|---|---|---|---|
| WO | WO-2016163759 A1 * | 10/2016 | | H04L 1/0009 |
| WO | WO2019160644 A1 | 8/2019 | | |
| WO | WO2019220643 A1 | 11/2019 | | |

OTHER PUBLICATIONS

Qualcomm Incorporated: "Summary for Rel-15 DL/UL Data Scheduling and HARQ Procedure", 3GPP Draft, 3GPP TSR-RAN WG1 Meeting #94bis, R1-1811854, Summary of 7.1.3.3 (Scheduling HARQ)_V2, 3rd Generation Partnership Project (3GPP), Mobile Competence Centre, 650, Route Des Lucious, F-06921 Sophia-Antipolis Cedex, France, vol. RAN WG1, No. Chengdu, China, Oct. 8, 2018-Oct. 12, 2018, Oct. 9, 2018 (Oct. 9, 2018), XP051519179, 39 pages, Retrieved from the Internet URL: http://www.3gpp.org/ftp/tsg%5Fran/WG1%5FRL1/TSGR1 %5F94b/Docs/R1%2D1811854%2Ezip, [retrieved on Oct. 9, 2018], the whole document.

International Search Report and Written Opinion—PCT/US2020/029495—Isa/Epo—dated Sep. 21, 2020.

* cited by examiner

UPLINK SCHEDULING TECHNIQUES FOR ENHANCED FEEDBACK IN WIRELESS COMMUNICATIONS

CROSS REFERENCE

The present application for patent claims the benefit of U.S. Provisional Patent Application No. 62/839,373 by GUPTA et al., entitled "UPLINK SCHEDULING TECHNIQUES FOR ENHANCED FEEDBACK IN WIRELESS COMMUNICATIONS," filed Apr. 26, 2019, assigned to the assignee hereof, and expressly incorporated by reference herein.

BACKGROUND

The following relates generally to wireless communications, and more specifically to uplink scheduling techniques for enhanced feedback in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some cases, various applications (e.g., motion control, discrete manufacturing, etc.) may communicate based on a periodic schedule with transmissions that include relatively small amounts of data. Additionally, in some environments (e.g., industrial Internet of Things (I-IoT), factory automation deployments, etc.), both control and data channels may have relatively stringent quality of service (QoS) targets, such as stringent latency, jitter, and reliability requirements for data or control traffic. In some cases, such traffic may be supported in a wireless communications system using a high reliability service, such as an ultra-reliable low latency communication (URLLC) service. In order to meet such relatively stringent QoS requirements, the time between an initial transmission and a retransmission may be reduced.

SUMMARY

The described techniques relate to improved methods, systems, devices, and apparatuses that support uplink scheduling techniques for enhanced feedback in wireless communications. Various described techniques provide for efficient allocation of feedback resources and transmission of feedback for low latency communications. In some cases, a first user equipment (UE) may be allocated uplink resources for uplink transmissions having one or more gaps during which a second UE may transmit feedback information to initiate a retransmission within specified time limits to achieve desired quality of service (QoS) targets. Various techniques discussed in the present disclosure provide for allocation of uplink resources and feedback transmissions using such uplink resources within such time limits.

In some cases, the one or more gaps may be provided through a downlink control information (DCI) message that indicates uplink resources to the first UE based on a first starting transmission symbol and a first length indicator, and a second starting transmission symbol and a second length indicator. In other cases, the one or more gaps may be provided through one or more reserved symbols that may be indicated to UEs that are served by a base station (e.g., via radio resource control (RRC) signaling, a slot format indicator (SFI), DCI). The first UE may skip uplink transmissions in one or more reserved symbols in cases where allocated resources of the first UE span the reserved symbol(s).

A method of wireless communication at a UE is described. The method may include receiving a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator, transmitting a first portion of the uplink communications using the first starting transmission symbol for a first transmission duration according to the first length indicator, and transmitting a second portion of the uplink communications using the second starting transmission symbol for a second transmission duration according to the second length indicator.

An apparatus for wireless communication at a UE is described. The apparatus may include a processor, memory in electronic communication with the processor, and instructions stored in the memory. The instructions may be executable by the processor to cause the apparatus to receive a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator, transmit a first portion of the uplink communications using the first starting transmission symbol for a first transmission duration according to the first length indicator, and transmit a second portion of the uplink communications using the second starting transmission symbol for a second transmission duration according to the second length indicator.

Another apparatus for wireless communication at a UE is described. The apparatus may include means for receiving a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator, transmitting a first portion of the uplink communications using the first starting transmission symbol for a first transmission duration according to the first length indicator, and transmitting a second portion of the uplink communications using the second starting transmission symbol for a second transmission duration according to the second length indicator.

A non-transitory computer-readable medium storing code for wireless communication at a UE is described. The code may include instructions executable by a processor to receive a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator, transmit a first portion of the uplink communications using the first starting transmission symbol for a first transmission duration according to the first length indicator, and transmit a second portion of the uplink communications using the second starting transmission symbol for a second transmission duration according to the second length indicator.

In some examples of the method, apparatuses, and non-transitory computer-readable medium described herein, at least a first transmission symbol separates the first portion of the uplink communications and the second portion of the uplink communications, and where one or more other UEs transmit feedback information to the base station in the first transmission symbol.

In some examples of the method, apparatuses, and non-transitory computer-readable medium described herein, the receiving may include operations, features, means, or instructions for receiving a single resource indicator value in the DCI, and determining the first starting transmission symbol, the first length indicator, the second starting transmission symbol, and the second length indicator based on the single resource indicator value. In some examples of the method, apparatuses, and non-transitory computer-readable medium described herein, the single resource indicator value provides a joint mapping to at least a first indicator value that indicates the first starting transmission symbol and the first length indicator, and a second indicator value that indicates the second starting transmission symbol and the second length indicator. In some examples of the method, apparatuses, and non-transitory computer-readable medium described herein, the single resource indicator value may be a weighted sum of a first power applied to a base coordinate multiplied by the first indicator value and a second power applied to the base coordinate multiplied by the second indicator value.

In some examples of the method, apparatuses, and non-transitory computer-readable medium described herein, the base coordinate provides a unique mapping for each of a maximum number of indicators that may be mapped to the single resource indicator value. In some examples of the method, apparatuses, and non-transitory computer-readable medium described herein, the first indicator may be a first start and length indicator value (SLIV) and the second indicator may be a second SLIV. In some examples of the method, apparatuses, and non-transitory computer-readable medium described herein, the receiving may include operations, features, means, or instructions for receiving a single resource indicator value in each of two or more DCI messages, and determining the first starting transmission symbol and the first length indicator based on a first DCI message, and the second starting transmission symbol and the second length indicator based on a second DCI message.

A method of wireless communication at a UE is described. The method may include receiving, from a base station, an indication of one or more reserved transmission symbols of an uplink slot, receiving a DCI message from the base station that indicates uplink resources in two or more transmission symbols for uplink communications from the UE to the base station, where the two or more transmission symbols overlap at least a first transmission symbol of the one or more reserved transmission symbols, and transmitting the uplink communications using the uplink resources, where the transmitting includes skipping the first transmission symbol.

An apparatus for wireless communication at a UE is described. The apparatus may include a processor, memory in electronic communication with the processor, and instructions stored in the memory. The instructions may be executable by the processor to cause the apparatus to receive, from a base station, an indication of one or more reserved transmission symbols of an uplink slot, receive a DCI message from the base station that indicates uplink resources in two or more transmission symbols for uplink communications from the UE to the base station, where the two or more transmission symbols overlap at least a first transmission symbol of the one or more reserved transmission symbols, and transmit the uplink communications using the uplink resources, where the transmitting includes skipping the first transmission symbol.

Another apparatus for wireless communication at a UE is described. The apparatus may include means for receiving, from a base station, an indication of one or more reserved transmission symbols of an uplink slot, receiving a DCI message from the base station that indicates uplink resources in two or more transmission symbols for uplink communications from the UE to the base station, where the two or more transmission symbols overlap at least a first transmission symbol of the one or more reserved transmission symbols, and transmitting the uplink communications using the uplink resources, where the transmitting includes skipping the first transmission symbol.

A non-transitory computer-readable medium storing code for wireless communication at a UE is described. The code may include instructions executable by a processor to receive, from a base station, an indication of one or more reserved transmission symbols of an uplink slot, receive a DCI message from the base station that indicates uplink resources in two or more transmission symbols for uplink communications from the UE to the base station, where the two or more transmission symbols overlap at least a first transmission symbol of the one or more reserved transmission symbols, and transmit the uplink communications using the uplink resources, where the transmitting includes skipping the first transmission symbol.

In some examples of the method, apparatuses, and non-transitory computer-readable medium described herein, one or more other UEs transmit feedback information to the base station in the first transmission symbol. In some examples of the method, apparatuses, and non-transitory computer-readable medium described herein, the receiving the indication of one or more reserved transmission symbols of the uplink slot may include operations, features, means, or instructions for receiving one or more of RRC signaling, an SFI, a specific DCI, or any combinations thereof, that indicates the one or more reserved transmission symbols.

Some examples of the method, apparatuses, and non-transitory computer-readable medium described herein multiple indications of one or more reserved transmission symbols of the uplink slot may be provided for different groups of physical resource blocks.

In some examples of the method, apparatuses, and non-transitory computer-readable medium described herein, the receiving the DCI message may include operations, features, means, or instructions for receiving a resource indicator value in the DCI message, determining the two or more transmission symbols based on a starting transmission symbol and a length indicator provided by the resource indicator value, and determining that the first transmission symbol overlaps the two or more transmission symbols. In some examples of the method, apparatuses, and non-transitory computer-readable medium described herein, the resource indicator value provides a mapping to the starting transmission symbol and the length indicator. In some examples of the method, apparatuses, and non-transitory computer-readable medium described herein, the resource indicator value may be a SLIV provided in the DCI.

A method of wireless communication at a base station is described. The method may include scheduling at least a first UE to transmit feedback information to the base station in at least a first uplink transmission symbol, scheduling a second UE with uplink resources in two or more uplink transmission symbols for uplink communications from the second UE to the base station, where the two or more uplink transmission symbols span the first uplink transmission symbol, transmitting a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol, receiving the feedback information from the first UE in the first uplink transmission symbol, and receiving the uplink communications from the second UE in the two or more uplink transmission symbols.

An apparatus for wireless communication at a base station is described. The apparatus may include a processor, memory in electronic communication with the processor, and instructions stored in the memory. The instructions may be executable by the processor to cause the apparatus to schedule at least a first UE to transmit feedback information to the base station in at least a first uplink transmission symbol, schedule a second UE with uplink resources in two or more uplink transmission symbols for uplink communications from the second UE to the base station, where the two or more uplink transmission symbols span the first uplink transmission symbol, transmit a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol, receive the feedback information from the first UE in the first uplink transmission symbol, and receive the uplink communications from the second UE in the two or more uplink transmission symbols.

Another apparatus for wireless communication at a base station is described. The apparatus may include means for scheduling at least a first UE to transmit feedback information to the base station in at least a first uplink transmission symbol, scheduling a second UE with uplink resources in two or more uplink transmission symbols for uplink communications from the second UE to the base station, where the two or more uplink transmission symbols span the first uplink transmission symbol, transmitting a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol, receiving the feedback information from the first UE in the first uplink transmission symbol, and receiving the uplink communications from the second UE in the two or more uplink transmission symbols.

A non-transitory computer-readable medium storing code for wireless communication at a base station is described. The code may include instructions executable by a processor to schedule at least a first UE to transmit feedback information to the base station in at least a first uplink transmission symbol, schedule a second UE with uplink resources in two or more uplink transmission symbols for uplink communications from the second UE to the base station, where the two or more uplink transmission symbols span the first uplink transmission symbol, transmit a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol, receive the feedback information from the first UE in the first uplink transmission symbol, and receive the uplink communications from the second UE in the two or more uplink transmission symbols.

In some examples of the method, apparatuses, and non-transitory computer-readable medium described herein, at least the first uplink transmission symbol separates the first portion of the uplink communications and the second portion of the uplink communications of the second UE.

In some examples of the method, apparatuses, and non-transitory computer-readable medium described herein, the transmitting the DCI message to the second UE may include operations, features, means, or instructions for transmitting a single resource indicator value in the DCI message, and where the first starting transmission symbol, the first length indicator, the second starting transmission symbol, and the second length indicator may be determined based on the single resource indicator value. In some examples of the method, apparatuses, and non-transitory computer-readable medium described herein, the single resource indicator value provides a joint mapping to at least a first indicator value that indicates the first starting transmission symbol and the first length indicator, and a second indicator value that indicates the second starting transmission symbol and the second length indicator.

In some examples of the method, apparatuses, and non-transitory computer-readable medium described herein, the single resource indicator value may be a weighted sum of a first power applied to a base coordinate multiplied by the first indicator value and a second power applied to the base coordinate multiplied by the second indicator value. In some examples of the method, apparatuses, and non-transitory computer-readable medium described herein, the base coordinate provides a unique mapping for each of a maximum number of indicators that may be mapped to the single resource indicator value. In some examples of the method, apparatuses, and non-transitory computer-readable medium described herein, the first indicator may be a first SLIV and the second indicator may be a second SLIV.

A method of wireless communication at a base station is described. The method may include identifying one or more reserved uplink transmission symbols of an uplink slot for feedback transmissions of at least a first UE, transmitting, to each of a set of UEs associated with the base station, an indication of the one or more reserved uplink transmission symbols, transmitting a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols, receiving the uplink communications from the second UE using the uplink resources, where the uplink communications from the second UE skip the first transmission symbol, and receiving the feedback transmissions from the first UE in the first transmission symbol.

An apparatus for wireless communication at a base station is described. The apparatus may include a processor, memory in electronic communication with the processor, and instructions stored in the memory. The instructions may be executable by the processor to cause the apparatus to identify one or more reserved uplink transmission symbols of an uplink slot for feedback transmissions of at least a first UE, transmit, to each of a set of UEs associated with the base station, an indication of the one or more reserved uplink transmission symbols, transmit a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols, receive the uplink communications from the second UE using the uplink resources, where the uplink communications from the second UE skip the first transmission symbol, and receive the feedback transmissions from the first UE in the first transmission symbol.

Another apparatus for wireless communication at a base station is described. The apparatus may include means for identifying one or more reserved uplink transmission symbols of an uplink slot for feedback transmissions of at least a first UE, transmitting, to each of a set of UEs associated with the base station, an indication of the one or more reserved uplink transmission symbols, transmitting a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols, receiving the uplink communications from the second UE using the uplink resources, where the uplink communications from the second UE skip the first transmission symbol, and receiving the feedback transmissions from the first UE in the first transmission symbol.

A non-transitory computer-readable medium storing code for wireless communication at a base station is described. The code may include instructions executable by a processor to identify one or more reserved uplink transmission symbols of an uplink slot for feedback transmissions of at least a first UE, transmit, to each of a set of UEs associated with the base station, an indication of the one or more reserved uplink transmission symbols, transmit a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols, receive the uplink communications from the second UE using the uplink resources, where the uplink communications from the second UE skip the first transmission symbol, and receive the feedback transmissions from the first UE in the first transmission symbol.

In some examples of the method, apparatuses, and non-transitory computer-readable medium described herein, the transmitting the indication of the one or more reserved transmission symbols of the uplink slot may include operations, features, means, or instructions for transmitting one or more of RRC signaling, a SFI, or a specific DCI, that indicates the one or more reserved transmission symbols.

Some examples of the method, apparatuses, and non-transitory computer-readable medium described herein may further include operations, features, means, or instructions for transmitting a separate DCI message to the first UE that indicates the first UE is to transit feedback information to the base station using the first transmission symbol. Some examples of the method, apparatuses, and non-transitory computer-readable medium described herein multiple indications of one or more reserved transmission symbols of the uplink slot may be provided for different groups of physical resource blocks.

In some examples of the method, apparatuses, and non-transitory computer-readable medium described herein, the transmitting the DCI message may include operations, features, means, or instructions for transmitting a resource indicator value in the DCI that indicates the two or more transmission symbols based on a starting transmission symbol and a length indicator provided by the resource indicator value, and where the first transmission symbol overlaps the two or more transmission symbols. In some examples of the method, apparatuses, and non-transitory computer-readable medium described herein, the resource indicator value provides a mapping to the starting transmission symbol and the length indicator. In some examples of the method, apparatuses, and non-transitory computer-readable medium described herein, the resource indicator value may be a SLIV provided in the DCI.

DETAILED DESCRIPTION

Figure 1:
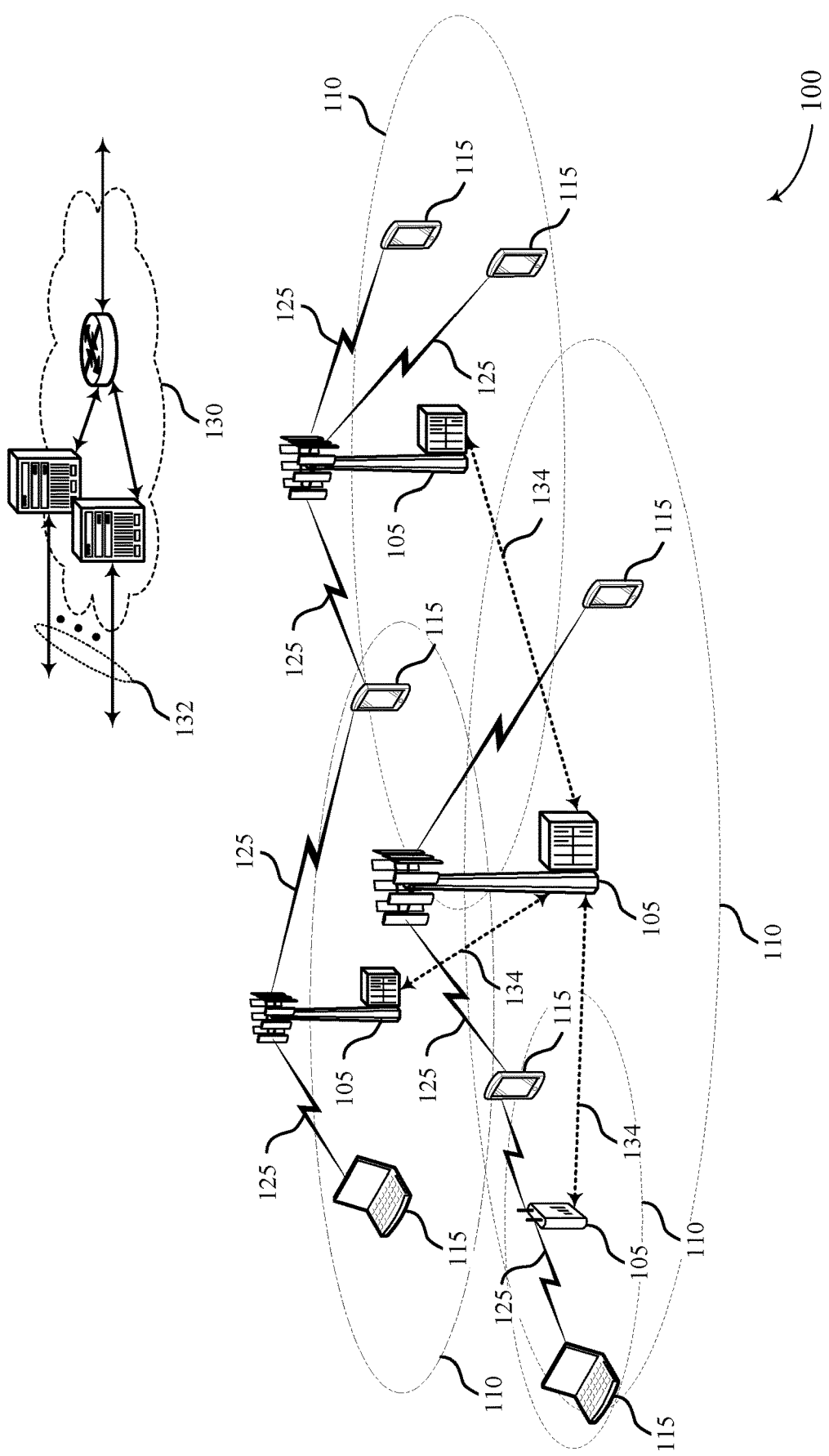
FIG. 1 illustrates an example of a wireless communications system in accordance with aspects of the present disclosure.

Various aspects of the present disclosure provide for efficient allocation of feedback resources and transmission of feedback for low latency communications. In some deployments, communications between a user equipment (UE) and a base station may have relatively strict quality-of-service (QoS) targets, such as stringent latency, jitter, and reliability targets or requirements for data or control traffic (e.g., less than 1 ms latency and $10^{-6}$ reliability). In some cases, a first UE may be allocated uplink resources for uplink transmissions, and a second UE identify feedback communications to transmit using uplink resources that overlap with the allocated uplink resources of the first UE in order to initiate a retransmission within certain time limits to achieve the QoS targets. For example, an industrial Internet of Things (I-IoT) or factory automation deployment may rely on relatively strict timing synchronization of data traffic for components (e.g., manufacturing tools in an assembly line), where such data traffic may be supported in a wireless communications system using a high reliability service, such as an ultra-reliable low latency communication (URLLC) service.

In some cases, in order to meet the QoS targets, unsuccessful communications may be retransmitted within a relatively short time period. In order to initiate such a retransmission, a UE may transmit feedback information (e.g., hybrid acknowledgment repeat request (HARQ) acknowledgment/negative-acknowledgment (ACK/NACK) feedback) that indicates a retransmission, with such feedback information transmitted within a relatively short timeframe (e.g., four orthogonal frequency division multiplexing (OFDM) symbols after completion of an initial transmission). Various techniques discussed in the present disclosure provide for allocation of uplink resources, and feedback transmissions using such uplink resources, within such time limits. In some cases, uplink resources may be allocated that provide one or more gaps in an uplink resource allocation to a first UE, where feedback transmissions of at least a second UE are transmitted in the one or more gaps.

In some cases, such gaps may be provided through a downlink control information (DCI) message that indicates uplink resources to the first UE based on a first starting transmission symbol and a first length indicator, and a second starting transmission symbol and a second length indicator. The second UE may transmit feedback information in the gaps that may trigger a retransmission in a time frame that supports the QoS targets. In some cases, the first UE may transmit a first portion of the uplink communications using the first starting transmission symbol for a first transmission duration according to the first length indicator prior to a gap, the second UE may transmit feedback information during a gap symbol, and the first UE may transmit a second portion of the uplink communications using the second starting transmission symbol for a second transmission duration according to the second length indicator. In some cases, the DCI may include a single resource indicator value (e.g., a start and length indicator value (SLIV)) that may be used by the first UE to determine the first starting transmission symbol, the first length indicator, the second starting transmission symbol, and the second length indicator. For example, the single resource indicator value may provide a joint mapping to at least a first indicator value that indicates the first starting transmission symbol and the first length indicator, and a second indicator value that indicates the second starting transmission symbol and the second length indicator (e.g., a weighted sum of a first power applied to a base coordinate multiplied by the first indicator value and a second power applied to the base coordinate multiplied by the second indicator value).

In other cases, gaps in uplink transmissions of the first UE may be provided through one or more reserved symbols that may be indicated to UEs that are served by a base station (e.g., via radio resource control (RRC) signaling, a slot format indicator (SFI), DCI, etc.), and the first UE may skip uplink transmissions in one or more reserved symbols in cases where allocated resources of the first UE span the reserved symbol(s). The second UE may transmit feedback information in the reserved symbols, and the feedback information may trigger a retransmission in a time frame that supports the QoS targets. In some cases, multiple indications of one or more reserved transmission symbols may be provided for different groups of physical resource blocks.

Such techniques may provide flexibility in scheduling uplink transmissions from multiple UEs. For example, feedback transmissions of one or more UEs may be transmitted using resources located within a span of uplink resources in order to trigger a retransmission within a desired time window. By providing that a first UE may transmit uplink transmissions before a feedback transmission of a second UE, after the feedback transmission of the second UE, or both, system efficiency may be enhanced, and QoS targets based on the feedback transmission timing may be reliably achieved. In some cases, a single resource indicator value may provide two or more starting symbol values and length indication values, which may reduce overhead associated with such uplink resource allocations relative to separate indicator values.

Aspects of the disclosure are initially described in the context of a wireless communications system. Additional wireless communications systems, periodic traffic transmissions and associated wireless resources, and process flows are then provided to describe aspects of the disclosure. Aspects of the disclosure are further illustrated by and described with reference to apparatus diagrams, system diagrams, and flowcharts that relate to uplink scheduling techniques for enhanced feedback in wireless communications.

FIG. 1 illustrates an example of a wireless communications system 100 that supports uplink scheduling techniques for enhanced feedback in wireless communications in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers. In some cases, one component carrier (CC) may utilize a different symbol duration than other CCs, which may include use of a reduced symbol duration and increased subcarrier spacing (SCS) as compared with symbol durations and SCS of the other component carriers. A shorter symbol duration may be associated with increased SCS. A device, such as a UE 115 or base station 105, utilizing CCs may transmit wideband signals (e.g., according to frequency channel or carrier bandwidths of 20, 40, 60, 80 MHz, etc.) at reduced symbol durations (e.g., 16.67 microseconds).

In various aspects of the present disclosure, described techniques provide for efficient allocation of feedback resources and transmission of feedback for low latency communications. In some cases, a first UE 115 may be allocated uplink resources for uplink transmissions, the allocated resources having one or more gaps during which a second UE 115 may transmit feedback information to initiate a retransmission within specified time limits to achieve desired QoS targets.

Figure 2:
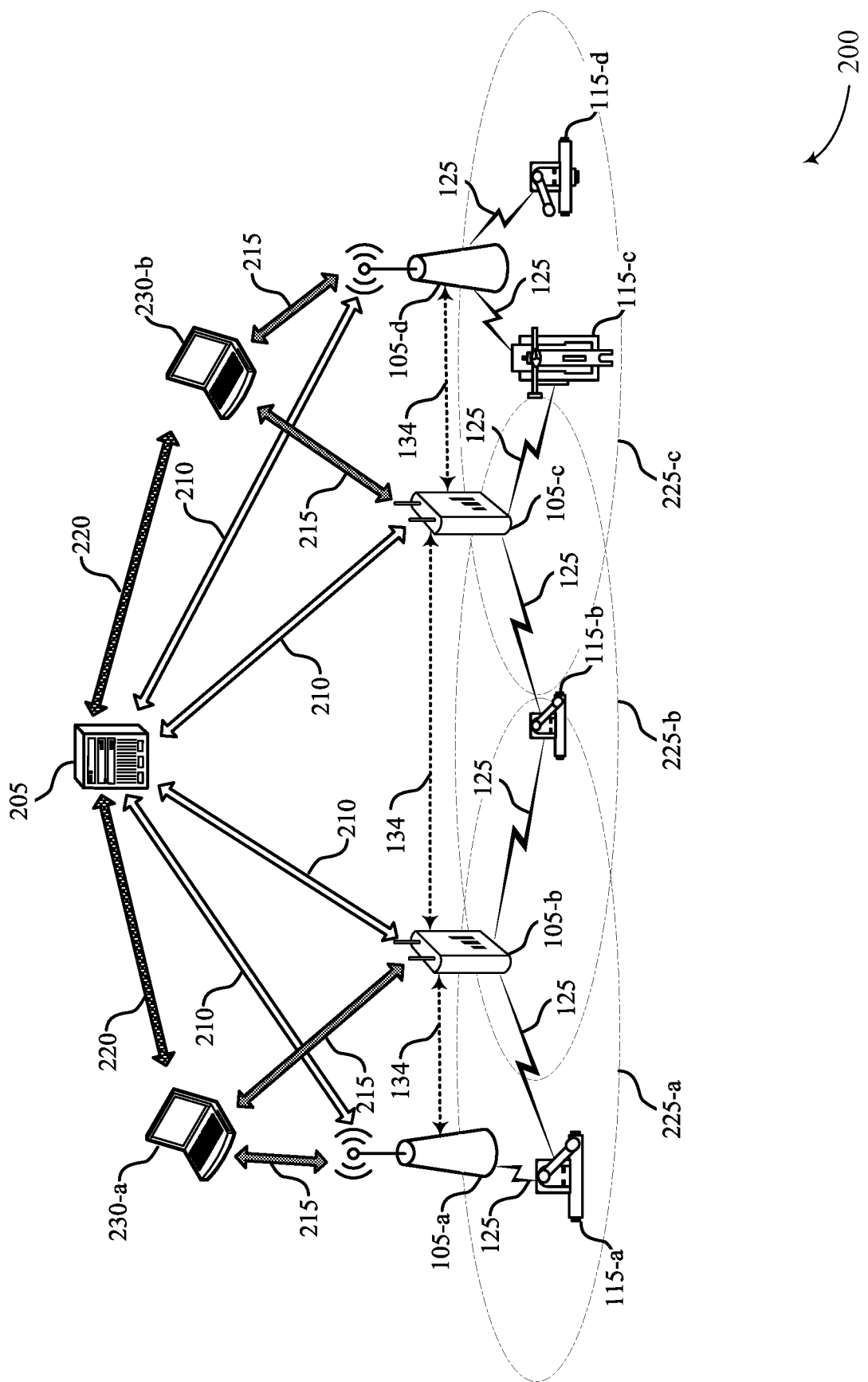
FIG. 2 illustrates an example of a wireless communications system in accordance with aspects of the present disclosure.

FIG. 2 illustrates an example of a portion of a wireless communications system 200 that supports uplink scheduling techniques for enhanced feedback in wireless communications in accordance with aspects of the present disclosure. In some examples, wireless communications system 200 may implement aspects of wireless communications system 100. In wireless communications system 200, a network node 205 (e.g., a multicell/multicast coordination entity (MCE), a node within the core network 130, etc.) may configure one or more components of the wireless communications system 200 to operate according to low latency operations (e.g., URLLC) to facilitate the exchange of data traffic between two or more devices within the wireless communications system 200 according to desired QoS targets. In some cases, the wireless communications system 200 may be located in an industrial setting, and each of the UEs 115 may be associated with a piece of equipment that may include a sensor/actuator (S/A) within the industrial setting, although techniques provided herein may be used in any of a number of other deployment scenarios. In some cases, a number of different network nodes 205 may be provided within the wireless communications system 200.

In the example of FIG. 2, a number of coverage areas 225 may each include multiple base stations 105 capable of communicating with one or more UEs 115 within the coverage area 225. The base stations 105 may be any one of a base station, a TRP, an eNB, a gNB, an IoT gateway, a cell, etc. The base stations 105 may communicate with a management system (e.g., a network node 205) via links 210. The management system may include, for example, an industrial PC which may provide controller programming for one or more other nodes in wireless communications system 200.

In the example of FIG. 2, the base stations 105 may also communicate with human-machine-interfaces (HMIs) 230 via communications links 215 and HMIs 230 may communicate with network node 205 (or other management system) via links 220. HMIs 230 may include, for example, tablet computers, control panels, wearable devices, control computers, and the like, which may provide control for different equipment within the system (e.g., start/stop control, mode change control, augmented or virtual reality control, etc., for a piece of equipment that may include a UE 115).

In some cases, one or more programmable logic controllers (PLCs) may be associated with one or more base stations 105 and may issue a series of commands (e.g., motion commands for a piece of equipment), receive sensor inputs (e.g., position of a robotic arm of a piece of equipment), and coordinate with other PLCs. In such cases, the wireless communications between the base stations 105, UEs 115, HMIs 230, network node 205, and/or one or more other network functions or nodes may provide near real-time information in accordance with QoS targets. In some cases, wireless communications system 200 may provide for low latency communications among the base stations 105 and UEs 115 to achieve the QoS targets. For example, in some cases, a first base station 105-a may transmit a downlink communication to a first UE 115-a, and may also allocate uplink resources to a second UE 115-b for uplink communications of the second UE 115-b (e.g., physical uplink control channel (PUCCH) and/or physical uplink shared channel (PUSCH) communications). In order to allow the first UE 115-a to transmit feedback information related to the downlink communication, one or more gaps in the uplink communications of the second UE 115-b may be provided, and the first UE 115-b may transmit a feedback message in the one or more gaps. In some cases, if the feedback message is a negative acknowledgment (e.g., a HARQ NACK indication), the first base station 105-a may retransmit the downlink communication within a time period that may comply with a link budget associated with the low latency communications. Such gaps may be provided through multiple start and length indications (SLIs), through one or more reserved symbols configured by the first base station 105-a or network node 205, or any combination thereof.

Figure 3:
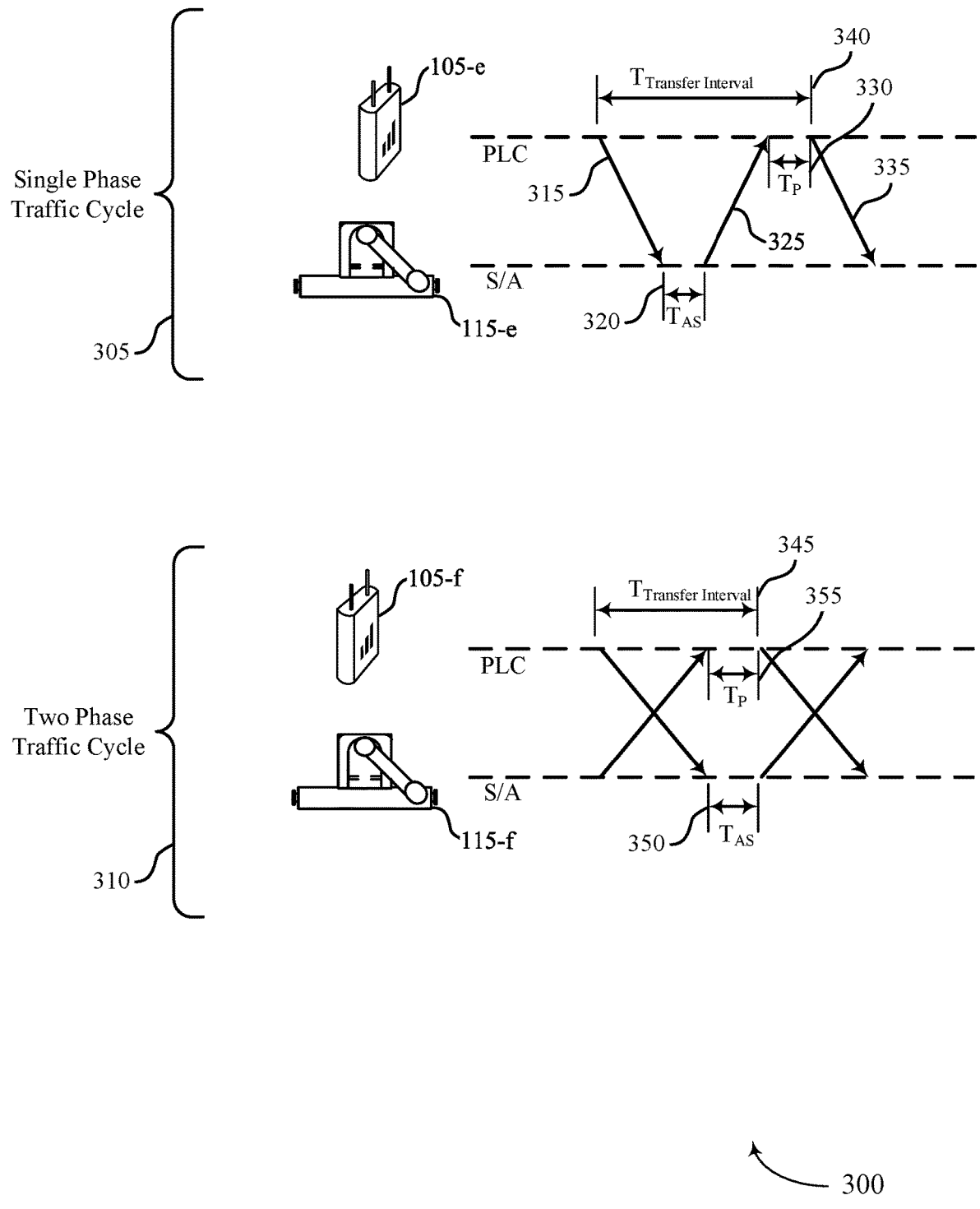
FIG. 3 illustrates an example of traffic cycles in accordance with aspects of the present disclosure.

FIG. 3 illustrates an example of traffic cycles 300 that support uplink scheduling techniques for enhanced feedback in wireless communications in accordance with aspects of the present disclosure. In some examples, traffic cycles 300 may implement aspects of wireless communications system 100 or 200. In this example, a single phase traffic cycle 305 and a two phase traffic cycle 310 are illustrated.

The single phase traffic cycle 305 may include a downlink communication 315 from a base station 105-e (e.g., from a PLC associated with the base station 105-e) to a UE 115-e (e.g., a motion command for an S/A located on a piece of industrial equipment associated with the UE 115-e). The UE 115-e may transmit a response communication 325 (e.g., a confirmation of an actuator movement or a sensor reading) to the base station 105-e following a period $T_{AS}$ 320. The period $T_{AS}$ 320 may correspond to an actuation and sensing duration during which the UE 115-e may prepare the response communication 325 with information related to actuation and sensing of the S/A associated with UE 115-e, ACK/NACK feedback of the downlink communication 315, or both. The response communication 325 may be received by the base station 105-e, and a PLC associated with the base station 105-e may perform processing and control procedures during a processing period $T_P$ 330, following which the PLC and base station 105-e may transmit another downlink communication 335 (which may be a retransmission of the initial downlink communication 315). The total duration between the initial downlink communication 315 and the end of the processing period $T_P$ 330 may be referred to as a transfer interval that has a period $T_{Transfer\ Interval}$ 340.

The two phase traffic cycle 310 may also include downlink communications from base station 105-f and uplink response communications from UE 115-f that are transmitted concurrently starting at the beginning of the transfer interval $T_{Transfer\ Interval}$ 345. In such cases, the actuation and sensing duration $T_{AS}$ 350 and the processing period $T_P$ 355 may overlap and run at least partially concurrently, and the total transfer interval may be reduced relative to single phase traffic cycle 305. In some cases, such traffic cycles may support factory automation deployments, which may have relatively deterministic and periodic communications (e.g., sensor readings and commands may be exchanged according to a periodic cycle), and may have relatively stringent latency and reliability requirements (e.g., 1 ms latency with a $10^{-6}$ or lower error rate). In such cases, in the event that one of the communications between a UE 115 and a base station 105 is not successfully received (e.g., due to interference from another transmitting device), a retransmission of the communication may be initiated relatively quickly to meet timing constraints of a corresponding link budget for wireless communications between the UE 115 and base station 105. Communications according to traffic cycles 300 may use wireless resources that are allocated by a base station 105 or other network node for such traffic cycles 300, such as in the examples of FIGS. 4 through 7.

Figure 4:
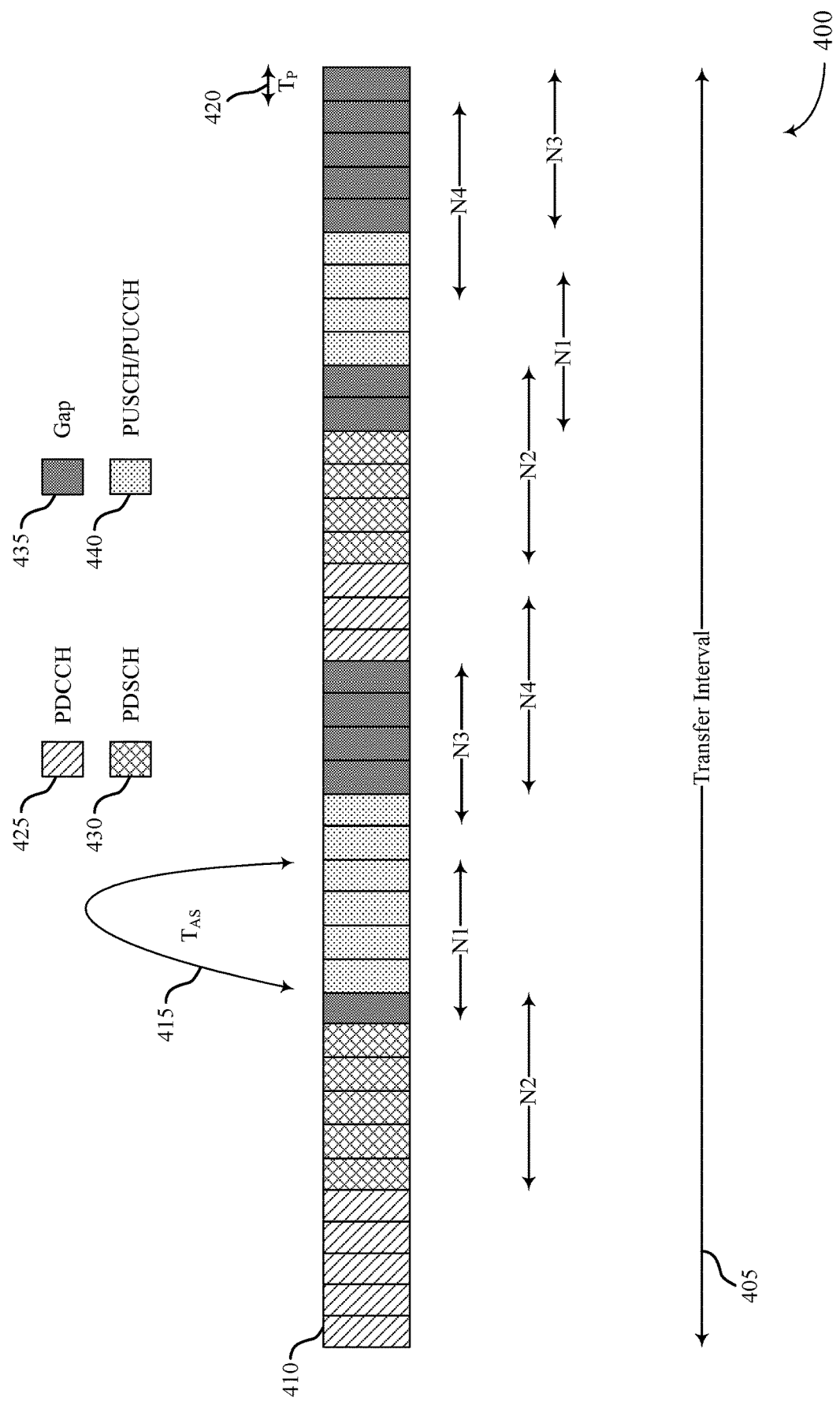
FIG. 4 illustrates an example of wireless resource allocations in accordance with aspects of the present disclosure.

FIG. 4 illustrates an example of wireless resource allocations 400 that support uplink scheduling techniques for enhanced feedback in wireless communications in accordance with aspects of the present disclosure. In some examples, wireless resource allocations 400 may implement aspects of wireless communications system 100 or 200. In this example, a transfer interval 405 for downlink and uplink communications between a PLC and S/A may include a number of OFDM symbols 410. In addition, wireless resources may be allocated for physical downlink control channel (PDCCH) 425 transmissions, physical downlink shared channel (PDSCH) 430 transmissions, transmission gaps 435, and PUSCH and PUCCH 440 transmissions.

In this example, a time period N1 may correspond to a timing between an end of a downlink transmission (e.g., an end of a PDSCH 430 transmission) and an uplink transmission with feedback information (e.g., HARQ ACK/NACK information) associated with the downlink transmission. A time period N2 may correspond to a UE processing time between an end of a PDCCH 425 transmission and when the UE is prepared to transmit a PUSCH/PUCCH 440 transmission (e.g., PUSCH/PUCCH 440 with S/A information). A time period N3 may correspond to a base station processing time between an uplink transmission and a downlink PDCCH 425 transmission. A time period N4 may correspond to a timing between an end of an uplink transmission (e.g., an end of a PUSCH/PUCCH 440 transmission) and a downlink transmission with base station feedback information (e.g., HARQ ACK/NACK information) associated with the uplink transmission. In some cases, the UE may have an actuating sensing duration, $T_{AS}$ 415, that corresponds to N1, and the base station may have a processing duration, $T_P$ 420, that corresponds to one OFDM symbol.

In some cases, the durations of one or more of N1, N2, N3, or N4 may be dependent upon a QoS associated with communications between the base station and the UE, a capability of the UE, a capability of the base station, or any combinations thereof. In one example, the duration of N1 and N3 are both 4.5 OFDM symbols and the duration of N2 and N4 are both 5.5 OFDM symbols, for a capability 2 UE when a 30 kHz subcarrier spacing is used. It is noted that other durations may be used, which may be based on QoS targets, UE capabilities, subcarrier spacings, and the like, and the techniques discussed herein may be used for deployments that use other durations between various communications.

In some cases, a UE may be allocated uplink resources, which may be indicated to the UE in DCI. In some cases, the DCI may include a SLIV that is mapped to a starting OFDM symbol of an uplink transmission of the UE and a length in a number of OFDM symbols of the uplink allocation. In some cases, DCI may include a SLIV that is mapped to a single starting OFDM symbol and a single length indicator (e.g., the SLIV may provide an index value to a row of a table that maps the index value to a starting symbol and a length combination). In some cases, a SLIV may be used in combination with one or more other parameters, such as a mapping type (e.g., a configured Type A or Type B mapping), a cyclic prefix duration (e.g., whether a normal or extended cyclic prefix is used), a subcarrier spacing, or any combinations thereof. However, in some cases, the single starting symbol and length indicator used to allocate resources to a first UE may not allow a second UE to transmit feedback information until after the first UE resource allocation. In cases where low latency and high reliability communications are used, a scheduler at a base station or other network node may be constrained to allocate relatively small amounts of resources in a particular resource allocation that is indicated by a SLIV, in order to schedule uplink resources to the second UE to transmit its feedback in time to initiate a retransmission within the link budget in the case of a NACK feedback. Aspects of the present disclosure provide that a schedule may allocate resources to the first UE, and the allocated resources may account for one or more symbols that may be used by the second UE for uplink feedback communications.

Figure 5:
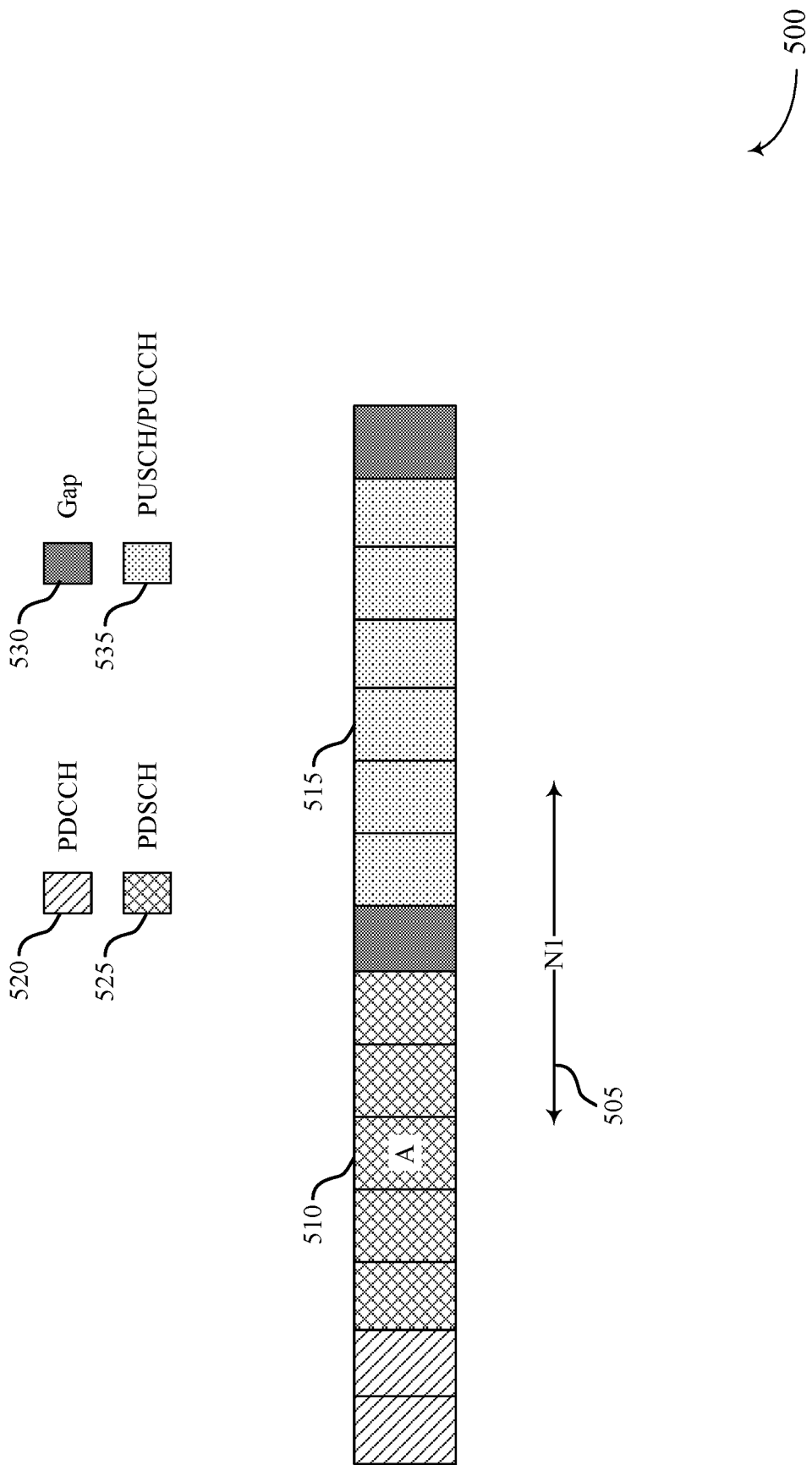
FIG. 5 illustrates an example of wireless resource allocations in accordance with aspects of the present disclosure.

FIG. 5 illustrates a wireless resource allocation 500 for uplink communications of a first UE. In some examples, wireless resource allocation 500 may implement aspects of wireless communications system 100 or 200. In this example, wireless resources may be allocated for PDCCH 520 transmissions, PDSCH 525 transmissions, transmission gaps 530, and PUSCH/PUCCH 535 transmissions. Further, in this example, a time duration N1 505 may correspond to 5 OFDM symbols (e.g., based on a 4.5 symbol duration for a category 2 UE). A base station may provide a resource allocation to a first UE that allocates PUSCH/PUCCH 535 resources for uplink transmissions of the first UE. The base station may also provide the second UE with DCI in a first OFDM symbol 510 where, in order to meet N3 requirements to schedule a retransmission to the second UE, the UE may transmit feedback at second OFDM symbol 515.

In cases where a scheduler would most efficiently schedule uplink PUSCH/PUCCH 535 resources for the first UE that span the second OFDM symbol 515, in cases where the single start indicator and single length indicator are provided, multiple different SLIVs may be provided to the first UE such that the second UE can transmit feedback information during the second OFDM symbol 515. Such multiple indications of SLIVs to the first UE may increase overhead, and may constrain certain scheduling decisions at the schedule based on constraints on available starting symbols, available lengths, and the like. Further, in some cases the first UE may be scheduled over a certain number of OFDM symbols (e.g., 5 OFDM symbols) in order to meet its associated link budget requirement (e.g., based on a modulation and coding scheme selected to achieve high reliability, to provide for one or more redundant transmissions, etc.). Various aspects of the present disclosure allow for multiple starting locations and multiple length indicators to be provided, for one or more reserved symbols, or combinations thereof, as discussed in examples of FIGS. 6 and 7.

Figure 6:
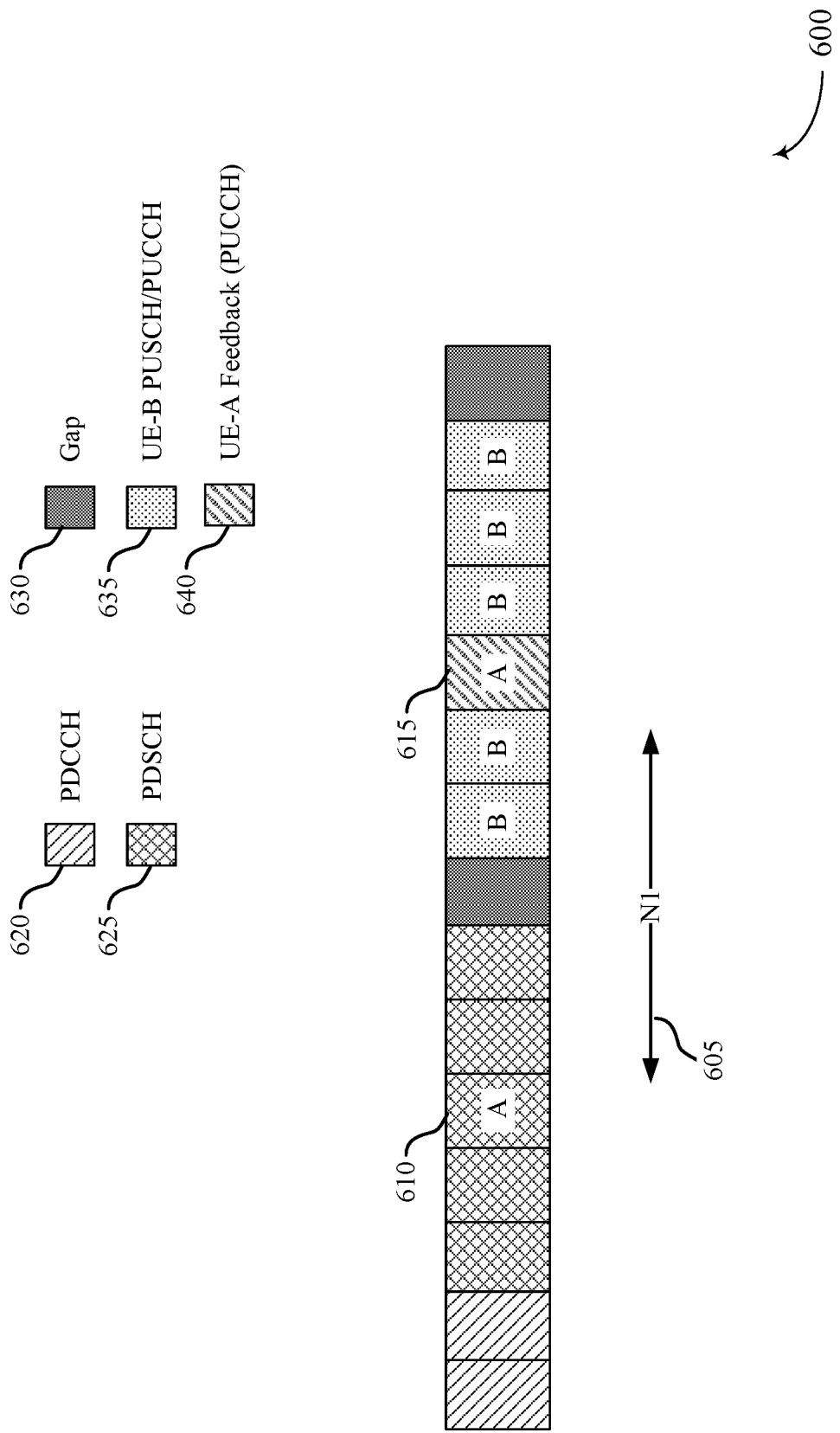
FIG. 6 illustrates an example of wireless resource allocations in accordance with aspects of the present disclosure.

FIG. 6 illustrates an example of a wireless resource allocation 600 that supports uplink scheduling techniques for enhanced feedback in wireless communications in accordance with aspects of the present disclosure. In some examples, wireless resource allocation 600 may implement aspects of wireless communications system 100 or 200. In this example, wireless resources may be allocated for PDCCH 620 transmissions, PDSCH 625 transmissions transmission gaps 630, UE-B PUSCH/PUCCH 635 transmissions, and UE-A feedback resources 640. Further, in this example, time duration N1 605 may correspond to 5 OFDM symbols (e.g., based on a 4.5 symbol duration for a category 2 UE). A base station may provide a resource allocation to UE-B that allocates UE-B PUSCH/PUCCH 535 resources for uplink transmissions. The base station may also provide UE-A with DCI in a first OFDM symbol 610 where, in order to meet N3 requirements to schedule a retransmission to UE-A, the feedback may be provided by second OFDM symbol 615.

In this example, in order to allow for UE-A to provide timely feedback, UE-A feedback resources 640 (e.g., PUCCH resources) may be allocated at the second OFDM symbol 615. Further, in order to allow for UE-B PUSCH/PUCCH 635 resources to span the second OFDM symbol 615, UE-B may be provided with multiple starting symbol and length indicators. For example, UE-B may be provided with a first indication of symbol-0 for a starting OFDM symbol and a length of 2, and with a second indication of symbol-3 and a length of 3 (e.g., two SLIs of UE-B may be (0,0) and (3,3)), such that the UE-B PUSCH/PUCCH 635 resources skip the second OFDM symbol 615. UE-A, in this example, may then be allocated uplink resources for the second OFDM symbol 615 (e.g., UE-A may be provided with a SLI of (2,1)). In some cases, the DCI format may limit the number of SLIs for PUSCH/PUCCH to a maximum number (e.g., to a maximum of two or three separate SLIs).

In some cases, the indicators of the starting symbol and length may be provided by a single SLIV provided in DCI to the UEs. For example, a SLIV may be based on a joint mapping of the allowed number of SLIs. In such a case, a DCI provided to UE-B may include a single SLIV that may be used to determine multiple SLIs. In some cases, the single SLIV may be a weighted sum of a first power applied to a base coordinate multiplied by the first indicator value, a second power applied to the base coordinate multiplied by the second indicator value, and so on up to a maximum number of SLIs that may be indicated by the single SLIV (e.g., $B^0*SLI(0)+B^1*SLI(1)+B^2*SLI(2)$, where the value of base B is selected to provide a unique mapping). In some cases, the joint mapping of the single SLIV to the multiple SLIs may be provided by a preconfigured table. Such techniques may provide for dynamic scheduling of timely feedback of UE-A, while also indicating UE-B uplink resources with flexibility and relatively low overhead.

Figure 7:
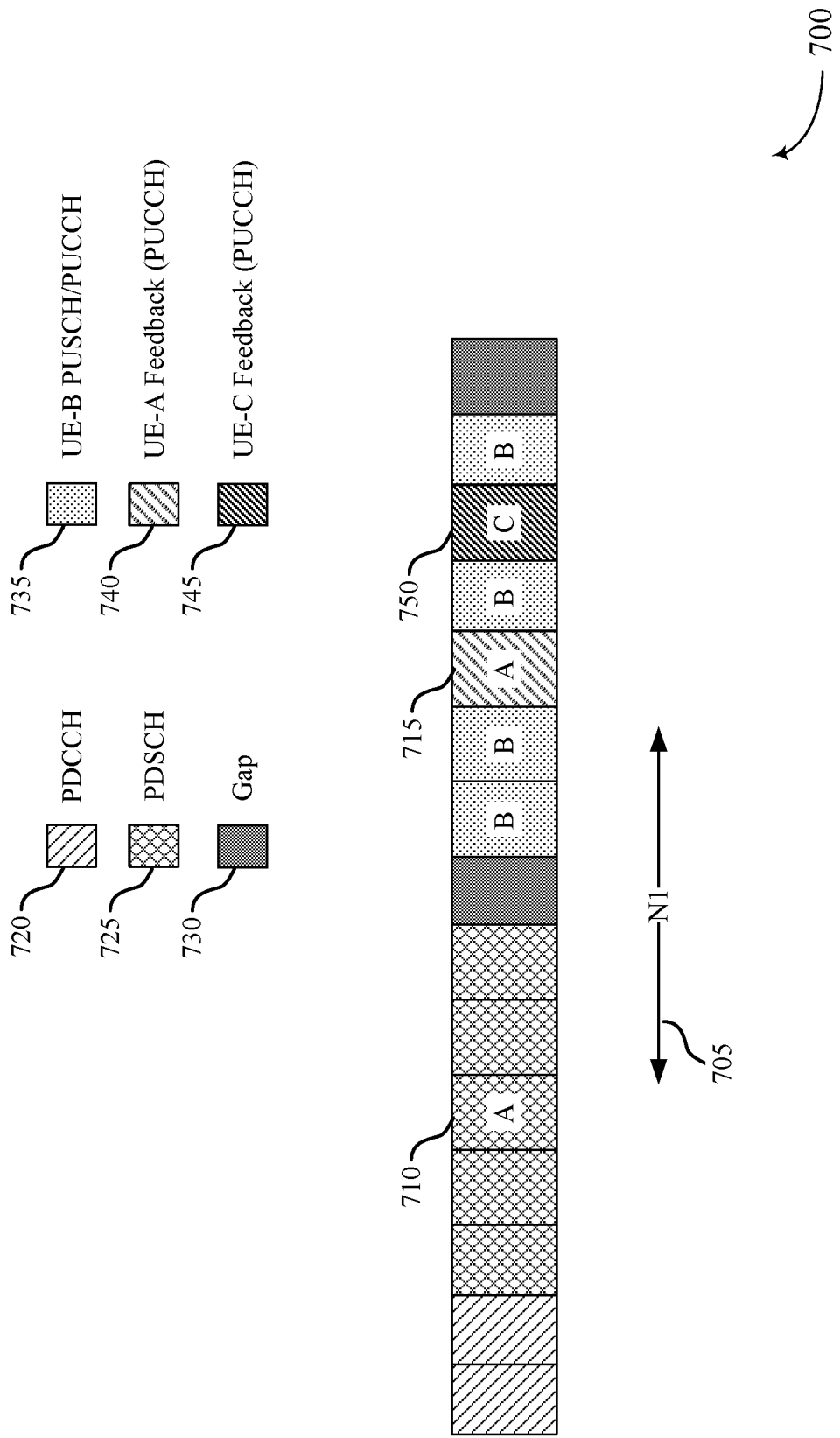
FIG. 7 illustrates an example of wireless resource allocations in accordance with aspects of the present disclosure.

FIG. 7 illustrates another example of a wireless resource allocation 700 that supports uplink scheduling techniques for enhanced feedback in wireless communications in accordance with aspects of the present disclosure. In some examples, wireless resource allocation 700 may implement aspects of wireless communications system 100. In this example, wireless resources may be allocated for PDCCH 720 transmissions, PDSCH 725 transmissions, transmission gaps 730, UE-B PUSCH/PUCCH 735 transmissions, UE-A feedback resources 740, and UE-C feedback resources 745. Further, in this example, time duration N1 705 may correspond to 5 OFDM symbols (e.g., based on a 4.5 symbol duration for a category 2 UE). A base station may provide a resource allocation to UE-B that allocates UE-B PUSCH/PUCCH 535 resources for uplink transmissions. The base station may also provide UE-A with DCI in a first OFDM symbol 710 where, in order to meet N3 requirements to schedule a retransmission to UE-A, the feedback may be provided by second OFDM symbol 715 that is allocated as UE-A feedback resources 740. Additionally, in this example, the base station may provide UE-C with uplink resource in third OFDM symbol 750 as UE-C feedback resources 745.

In this example, in order to allow for UE-A and UE-C to provide feedback, the second OFDM symbol 715 and the third OFDM symbol 750 may be reserved symbols for feedback. In some cases, the base station may provide an indication of the reserved symbols to served UEs through, for example, RRC signaling, SFI, specific DCI, or combinations thereof. In this example, UE-B may receive a SLIV that indicates a SLI of (0,6) (e.g., starting OFDM symbol 0 and a length of 6). UE-B in this case would also be aware that the second OFDM symbol 715 and the third OFDM symbol 750 are reserved (e.g., symbol 2 and 4 as indexed for the SLI), and UE-B would not transmit on these symbols. In this example, UE-A and UE-C may be specifically allocated resources in the reserved symbols for feedback transmissions. In some cases, the base station may configure different frequency resources to have different reserved symbols. For example, different physical resource blocks (PRBs) may have different reserved symbols. In such cases, the base station may provide multiple indications (e.g., different RRC configurations may be provided for different PRBs, different SFIs for different PRBs, etc.) of the one or more reserved transmission symbols of an uplink slot. Such techniques to reserve symbols and configure UEs with the reserved symbols may allow for efficient scheduling of uplink resources without modification of SLI indications and without having to transmit multiple SLI indications or SLIVs. In some examples, such reserved symbols may be configured in cases where periodic factory automation transmissions are used, such that periodic timing of feedback communications is known based on the periodic factory automation transmissions.

Figure 8:
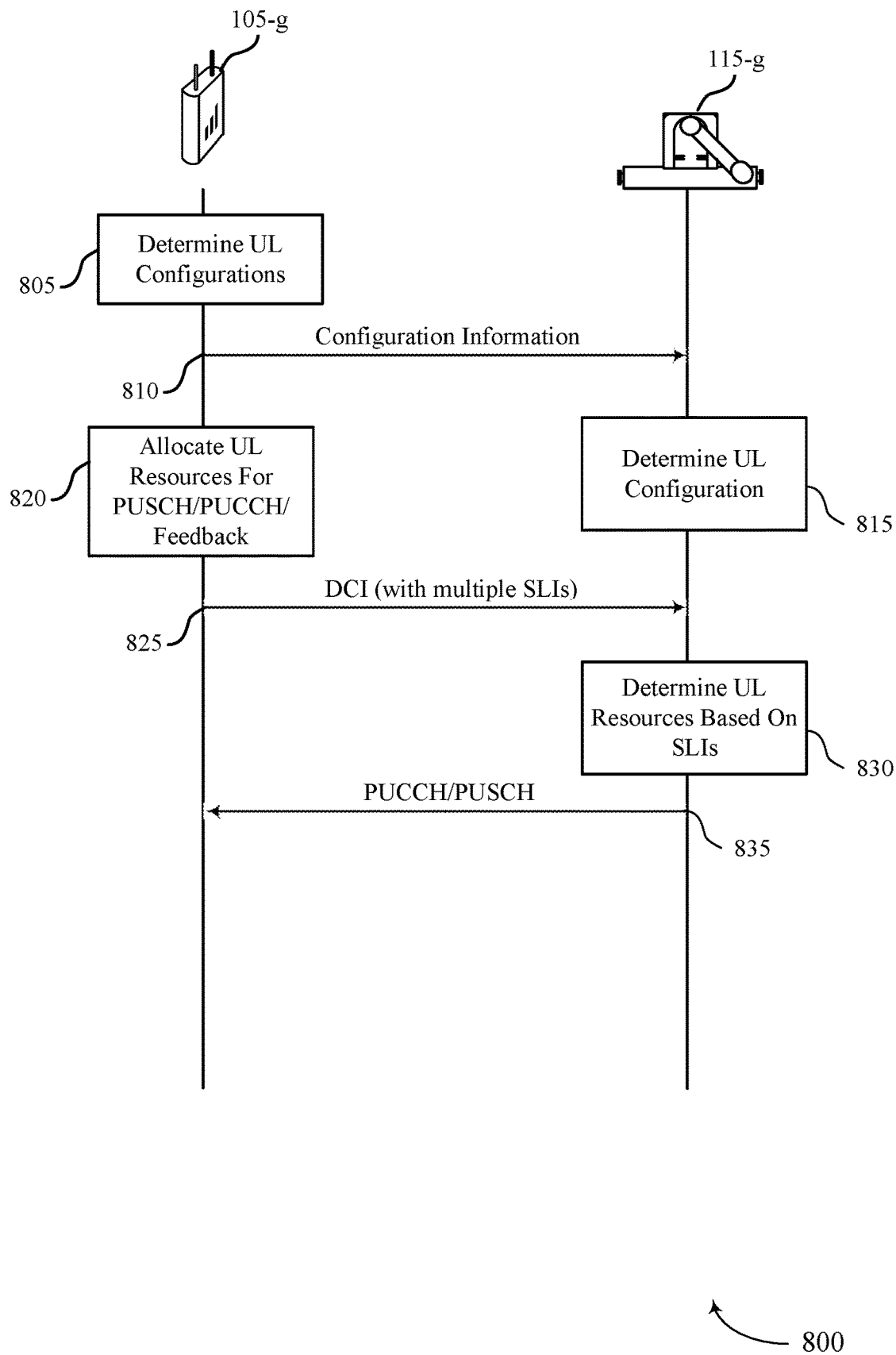
FIG. 8 illustrates an example of a process flow in accordance with aspects of the present disclosure.

FIG. 8 illustrates an example of a process flow 800 that supports uplink scheduling techniques for enhanced feedback in wireless communications in accordance with aspects of the present disclosure. In some examples, process flow 800 may implement aspects of wireless communications system 100 or 200. Process flow 800 may include a base station 105-g and a UE 115-g, which may be examples of a corresponding base station and UE as described herein with reference to FIGS. 1 through 7.

In the following description of the process flow 800, the operations between UE 115-g and base station 105-g may be performed in different orders or at different times. Certain operations may also be left out of the process flow 800, or other operations may be added to the process flow 800. It is to be understood that while UE 115-*g* and base station 105-*g* are shown performing a number of the operations of process flow 800, any wireless device may perform the operations shown.

At 805, base station 105-*g* may determine uplink configurations for uplink transmissions from UE 115-*g* (and one or more other served UEs). At 810, the base station 105-*g* may transmit the configuration information to UE 115-*g*. In some cases, the base station 105-*g* may determine the uplink configurations based on periodic communications that are to be performed between the base station 105-*g* and the UE 115-*g*. In some cases, the base station 105-*g* may determine that low latency and high reliability communications are to be performed between the base station 105-*g* and the UE 115-*g*, and may configure the UE 115-*g* with a number of SLIs that may be indicated in an uplink resource allocation (e.g., whether a SLIV may indicate one, two, or more SLIs for an uplink resource allocation).

At 815, the UE 115-*g* may receive the configuration information and determine the uplink configuration associated with uplink transmissions. In some cases, the UE 115-*g* may determine that the uplink configuration provides that multiple SLIs may be indicated, and may monitor for uplink resource allocations from the base station 105-*g* based on the multiple SLIs. In some cases, a DCI format may be indicated that includes DCI in a format that may indicate multiple SLIs, and the UE 115-*g* may monitor for DCI according to the DCI format identified based on the configuration information.

At 820, the base station 105-*g* may allocate uplink resources for uplink transmissions, such as PUCCH transmissions, PUSCH transmissions, feedback transmissions, or any combinations thereof. In some cases, the uplink resources may be allocated based on downlink transmissions that are transmitted to multiple UEs and associated timing for feedback communications from the multiple UEs. In some cases, the base station 105-*g* may allocate UE 115-*g* with uplink time resources that are not contiguous, such that a feedback transmission from another UE may be transmitted in a gap in the resources that are allocated to UE 115-*g*.

At 825, the base station 105-*g* may transmit DCI to the UE 115-*g*. In some cases, the DCI may indicate multiple SLIs. In some cases, the DCI may indicate a single SLIV that may be jointly mapped to multiple different SLIs, and the different SLIs may indicate the uplink resources of the UE 115-*g*. In some cases, the single SLIV may be a weighted sum of a first power applied to a base coordinate multiplied by a first indicator value for a first SLI and a second power applied to the base coordinate multiplied by a second indicator value for a second SLI. In other cases, additional indicator values may be present for additional SLIs.

At 830, the UE 115-*g* may determine its allocated uplink resources. In some cases, the uplink resources may be determined based on the multiple SLIs indicated in the DCI. In some cases, the multiple SLIs may be determined based on the joint mapping of different SLIs to a single SLIV.

At 835, the UE 115-*g* may transmit uplink transmissions (e.g., PUCCH/PUSCH transmissions) to the base station 105-*g* using the allocated resources. In some cases, the uplink transmissions may have one or more gaps in the transmissions to accommodate for feedback transmissions of one or more other UEs.

Figure 9:
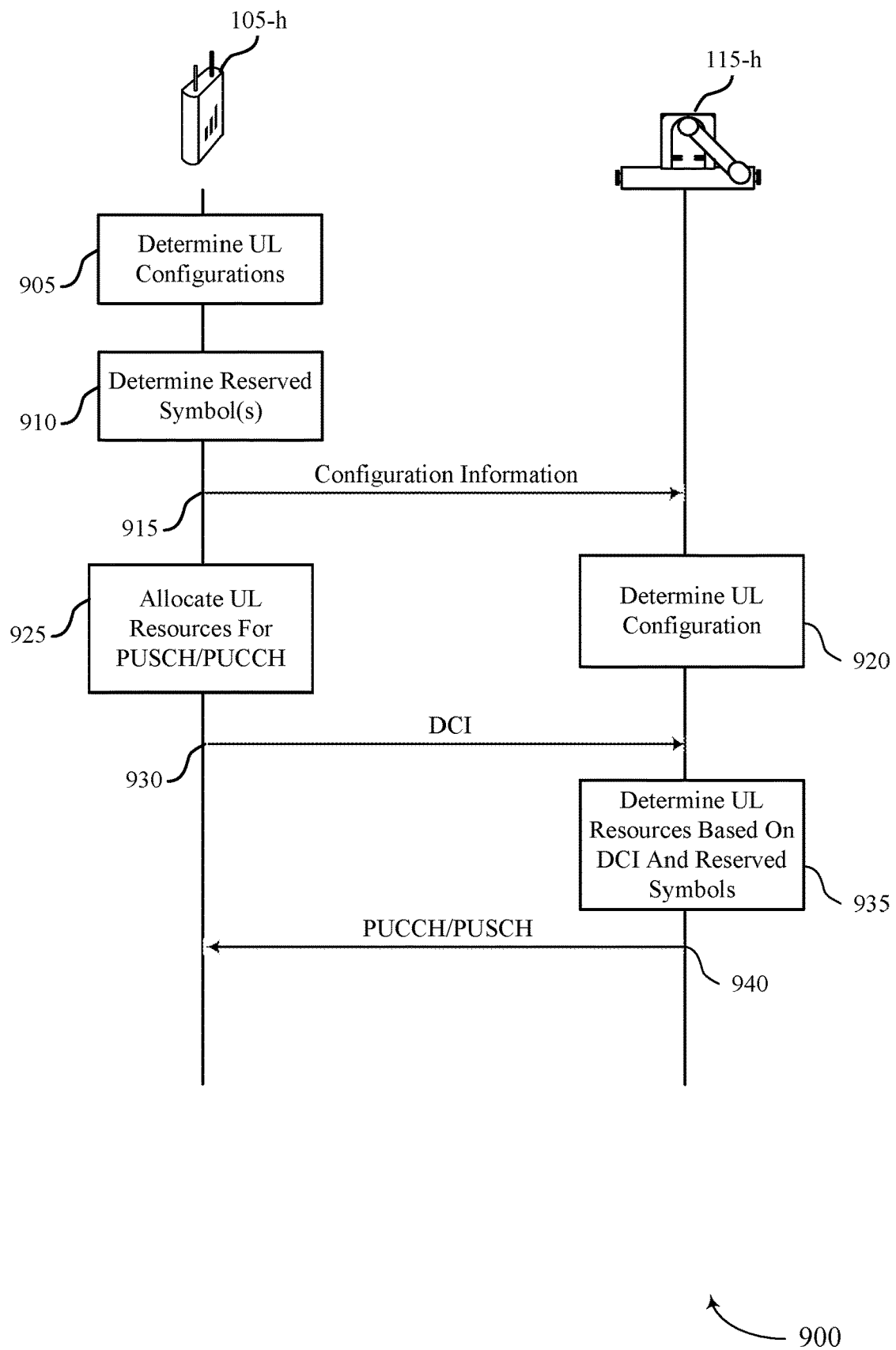
FIG. 9 illustrates an example of another process flow in accordance with aspects of the present disclosure.

FIG. 9 illustrates an example of a process flow 900 that supports uplink scheduling techniques for enhanced feedback in wireless communications in accordance with aspects of the present disclosure. In some examples, process flow 900 may implement aspects of wireless communications system 100 or 200. Process flow 900 may include a base station 105-*h* and a UE 115-*h*, which may be examples of a corresponding base station and UE as described herein with reference to FIGS. 1 through 7.

In the following description of the process flow 900, the operations between UE 115-*h* and base station 105-*h* may be performed in different orders or at different times. Certain operations may also be left out of the process flow 900, or other operations may be added to the process flow 900. It is to be understood that while UE 115-*h* and base station 105-*h* are shown performing a number of the operations of process flow 900, any wireless device may perform the operations shown.

At 905, base station 105-*h* may determine uplink configurations for uplink transmissions from UE 115-*h* (and one or more other served UEs). In some cases, the base station 105-*h* may determine the uplink configurations based on periodic communications that are to be performed between the base station 105-*h* and the UE 115-*h*. In some cases, the base station 105-*h* may determine that low latency and high reliability communications are to be performed between the base station 105-*h* and the UE 115-*h*, and that uplink configurations based on the low latency and high reliability communications are associated with deterministic and periodic uplink feedback communications.

At 910, the base station 105-*h* may determine one or more reserved symbols that are to be made available for uplink feedback communications of one or more UEs. In some cases, the base station 105-*h* may determine the one or more reserved symbols and may determine a configuration for the UE 115-*h* that indicates the reserved symbols. At 915, the base station 105-*h* may transmit the configuration information to UE 115-*h*. In some cases, the base station 105-*h* may configure different frequency resources to have different reserved symbols. For example, different PRBs may have one or more different reserved symbols.

At 920, the UE 115-*h* may receive the configuration information and determine the uplink configuration associated with uplink transmissions. In some cases, the UE 115-*h* may determine that the uplink configuration provides one or more reserved symbols within certain uplink slots that may not be used by the UE 115-*h* for PUSCH/PUCCH transmissions in the absence of a specific configuration to provide feedback communications using the one or more reserved symbols. In some cases, the configuration information may be provided in RRC signaling, in a SFI, in a specific DCI, or any combinations thereof.

At 925, the base station 105-*h* may allocate uplink resources for uplink transmissions, such as for PUCCH transmissions, PUSCH transmissions, or any combinations thereof. In some cases, the uplink resources may be allocated based on the one or more reserved symbol. For example, if the base station 105-*h* determines to allocate five uplink symbols to the UE 115-*h* starting at symbol zero of an uplink slot, and symbol two of the uplink slot is a reserved symbol, the base station 105-*h* may determine that a SLI for the uplink resources is (0, 6).

At 930, the base station 105-*h* may transmit DCI to the UE 115-*h*. In some cases, the DCI may indicate the allocated uplink resources that were determined based on the one or more reserved symbols. In the example as described above, the DCI may include a SLIV that maps to SLI (0, 6).

At 935, the UE 115-*h* may determine its allocated uplink resources based on the DCI and the one or more reserved symbols. At 940, the UE 115-*h* may transmit uplink transmissions (e.g., PUCCH/PUSCH transmissions) to the base station 105-*h* using the allocated resources. In some cases, the uplink transmissions may have one or more gaps in the transmissions at the one or more reserved symbols to accommodate for feedback transmissions of one or more other UEs.

Figure 10:
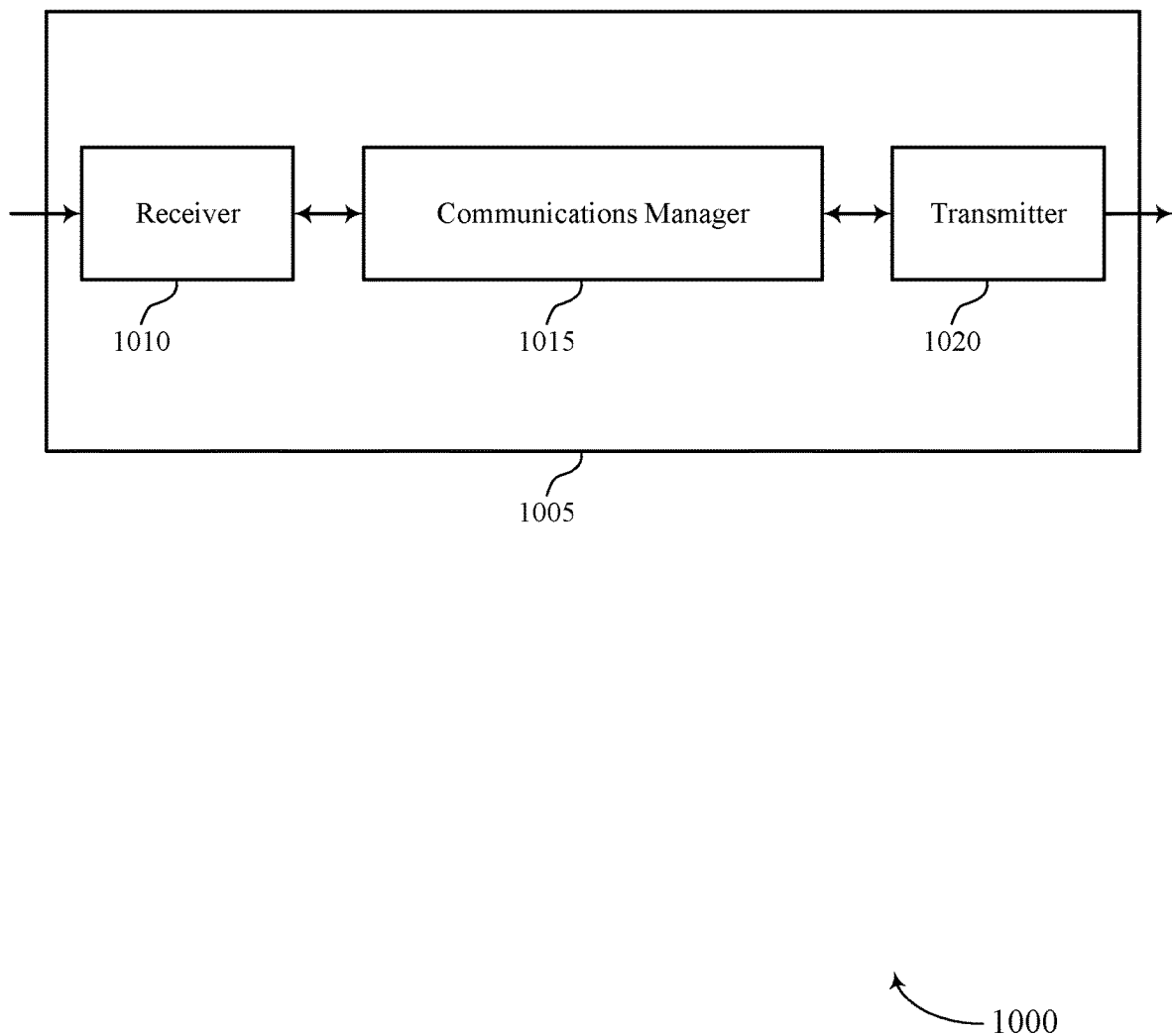
FIGS. 10 and 11 show block diagrams of devices in accordance with aspects of the present disclosure.

FIG. 10 shows a block diagram 1000 of a device 1005 that supports uplink scheduling techniques for enhanced feedback in wireless communications in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to uplink scheduling techniques for enhanced feedback in wireless communications, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may receive a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator, transmit a first portion of the uplink communications using the first starting transmission symbol for a first transmission duration according to the first length indicator, and transmit a second portion of the uplink communications using the second starting transmission symbol for a second transmission duration according to the second length indicator.

The communications manager 1015 may also receive, from a base station, an indication of one or more reserved transmission symbols of an uplink slot, receive a DCI message from the base station that indicates uplink resources in two or more transmission symbols for uplink communications from the UE to the base station, where the two or more transmission symbols overlap at least a first transmission symbol of the one or more reserved transmission symbols, and transmit the uplink communications using the uplink resources, where the transmitting includes skipping the first transmission symbol. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

In some examples, communications manager 1015 may be implemented as an integrated circuit or chipset for a mobile device modem, and the receiver 1010 and transmitter 1020 may be implemented as analog components (e.g., amplifiers, filters, antennas, etc.) coupled with the mobile device modem to enable wireless transmission and reception.

The communications manager 1015 as described herein may be implemented to realize one or more potential advantages. Various implementations may increase the efficiency of transmissions and retransmissions between devices in a wireless communications network, for example, devices communicating according to stringent latency or reliability targets. At least one implementation may enable the communications manager 1015 to dynamically schedule feedback for periodic traffic using various techniques described herein.

Based on implementing the enhanced feedback techniques as described herein, one or more processors of the device 1005 (e.g., processor(s) controlling or incorporated with one or more of receiver 1010, communications manager 1015, and transmitter 1020) may reduce latency and increase reliability of periodic transmissions (e.g., in a factory automation setting, etc.). In addition, the techniques may increase the efficiency of communications in a system including scheduling for a large number of devices.

Figure 11:
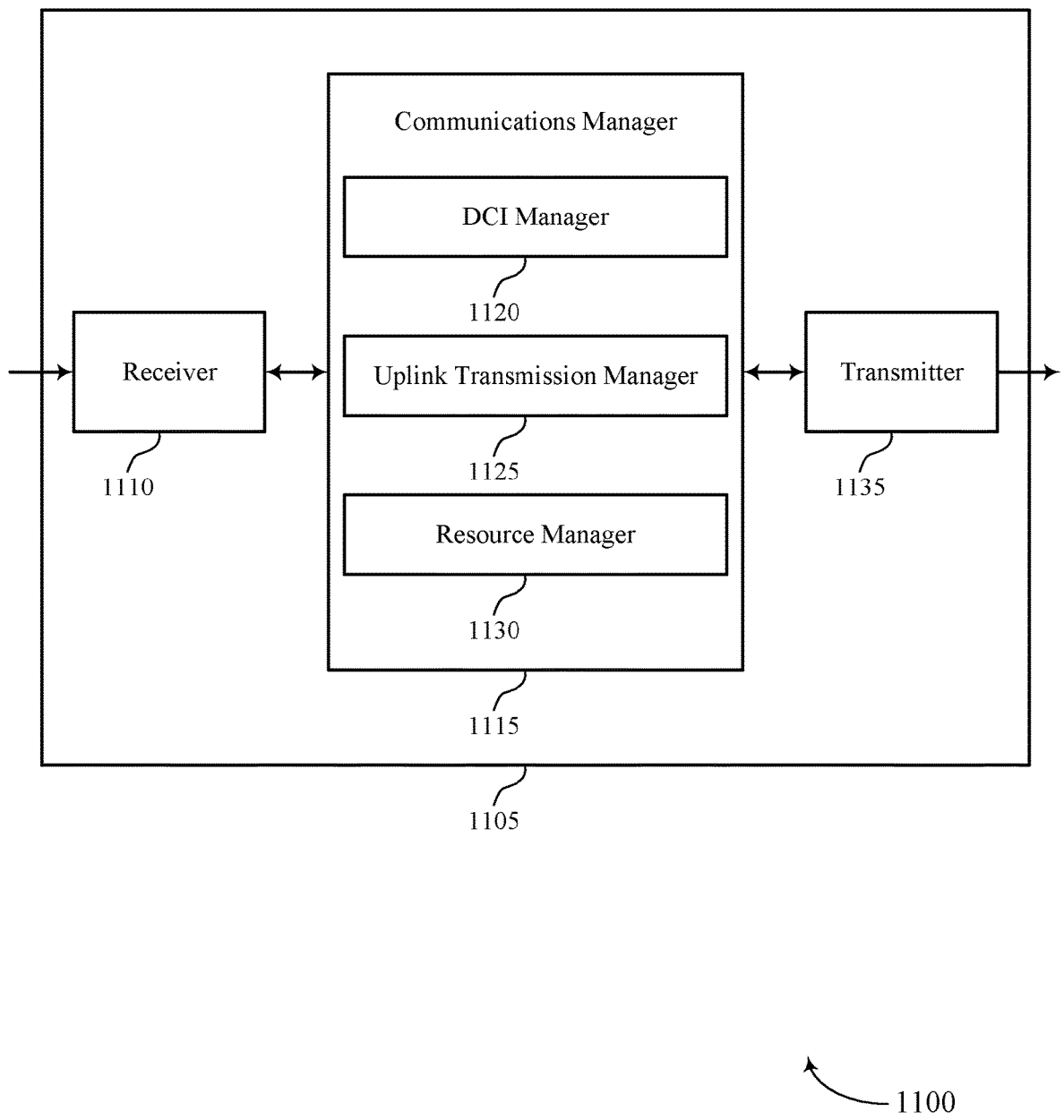

FIG. 11 shows a block diagram 1100 of a device 1105 that supports uplink scheduling techniques for enhanced feedback in wireless communications in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to uplink scheduling techniques for enhanced feedback in wireless communications, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a DCI manager 1120, an uplink transmission manager 1125, and a resource manager 1130. The communications manager 1115 may be an example of aspects of the communications manager 1310 described herein.

The DCI manager 1120 may receive a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator.

The uplink transmission manager 1125 may transmit a first portion of the uplink communications using the first starting transmission symbol for a first transmission duration according to the first length indicator and transmit a second portion of the uplink communications using the second starting transmission symbol for a second transmission duration according to the second length indicator.

The resource manager 1130 may receive, from a base station, an indication of one or more reserved transmission symbols of an uplink slot.

In some cases, the DCI manager 1120 may receive a DCI message from the base station that indicates uplink resources in two or more transmission symbols for uplink communications from the UE to the base station, where the two or more transmission symbols overlap at least a first transmission symbol of the one or more reserved transmission symbols. The uplink transmission manager 1125 may transmit the uplink communications using the uplink resources, where the transmitting includes skipping the first transmission symbol.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
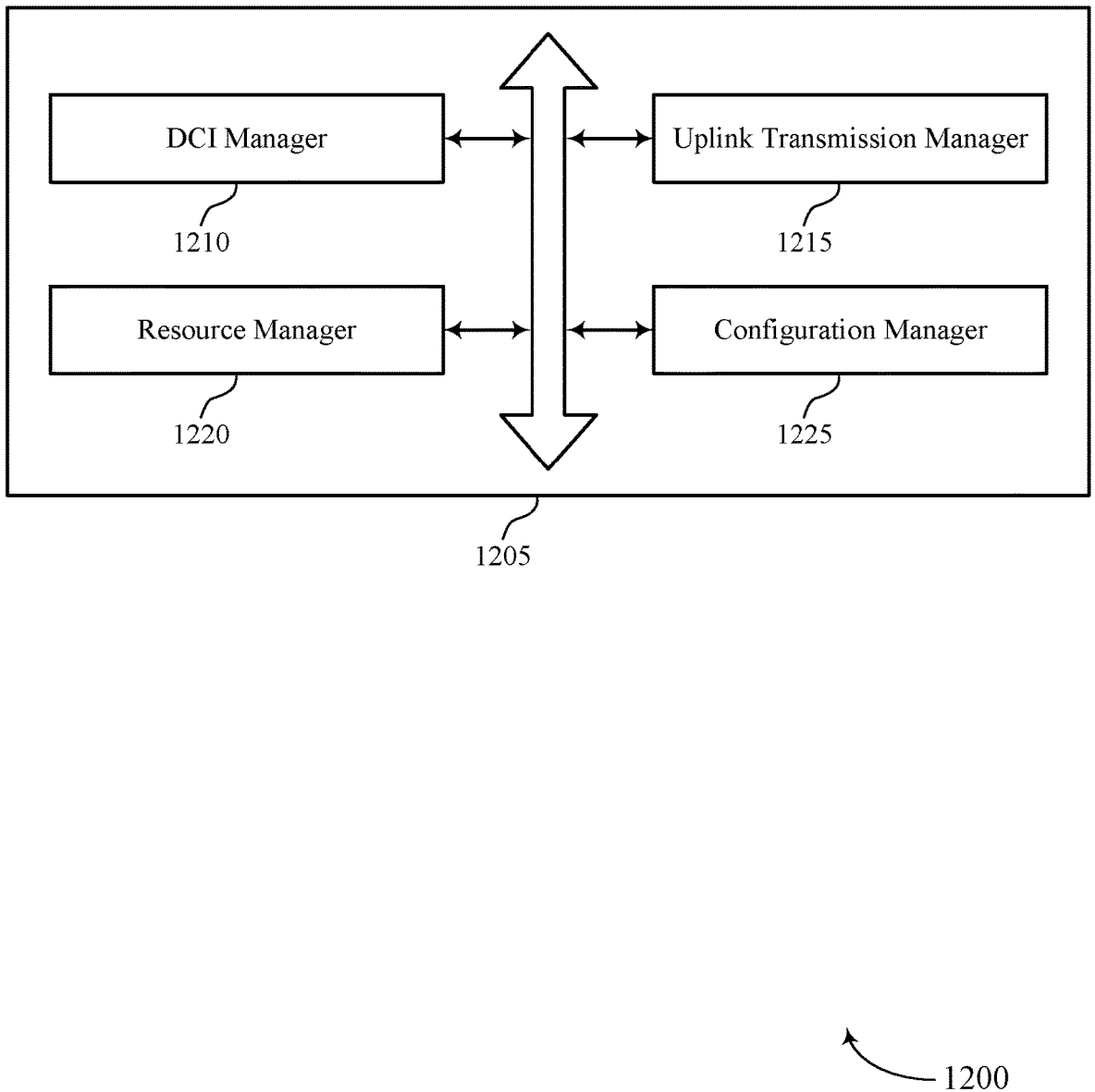
FIG. 12 shows a block diagram of a communications manager in accordance with aspects of the present disclosure.

FIG. 12 shows a block diagram 1200 of a communications manager 1205 that supports uplink scheduling techniques for enhanced feedback in wireless communications in accordance with aspects of the present disclosure. The communications manager 1205 may be an example of aspects of a communications manager 1015, a communications manager 1115, or a communications manager 1310 described herein. The communications manager 1205 may include a DCI manager 1210, an uplink transmission manager 1215, a resource manager 1220, and a configuration manager 1225. Each of these modules may communicate, directly or indirectly, with one another (e.g., via one or more buses).

The DCI manager 1210 may receive a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator.

In some examples, the DCI manager 1210 may receive a DCI message from the base station that indicates uplink resources in two or more transmission symbols for uplink communications from the UE to the base station, where the two or more transmission symbols overlap at least a first transmission symbol of the one or more reserved transmission symbols.

In some examples, the DCI manager 1210 may receive a single resource indicator value in the DCI. In some examples, the DCI manager 1210 may receive a single resource indicator value in each of two or more DCI messages. In some examples, the DCI manager 1210 may receive a resource indicator value in the DCI message. In some cases, the resource indicator value is a SLIV provided in the DCI.

The uplink transmission manager 1215 may transmit a first portion of the uplink communications using the first starting transmission symbol for a first transmission duration according to the first length indicator. In some examples, the uplink transmission manager 1215 may transmit a second portion of the uplink communications using the second starting transmission symbol for a second transmission duration according to the second length indicator. In some cases, at least a first transmission symbol separates the first portion of the uplink communications and the second portion of the uplink communications, and where one or more other UEs transmit feedback information to the base station in the first transmission symbol. In some examples, the uplink transmission manager 1215 may transmit the uplink communications using the uplink resources, where the transmitting includes skipping the first transmission symbol.

The resource manager 1220 may receive, from a base station, an indication of one or more reserved transmission symbols of an uplink slot.

In some examples, the resource manager 1220 may determine the two or more transmission symbols based on a starting transmission symbol and a length indicator provided by the resource indicator value. In some examples, the resource manager 1220 may determine the first starting transmission symbol, the first length indicator, the second starting transmission symbol, and the second length indicator based on the single resource indicator value. In some cases, the single resource indicator value provides a joint mapping to at least a first indicator value that indicates the first starting transmission symbol and the first length indicator, and a second indicator value that indicates the second starting transmission symbol and the second length indicator. In some cases, the single resource indicator value is a weighted sum of a first power applied to a base coordinate multiplied by the first indicator value and a second power applied to the base coordinate multiplied by the second indicator value. In some cases, the base coordinate provides a unique mapping for each of a maximum number of indicators that are mapped to the single resource indicator value. In some cases, the first indicator is a first SLIV and the second indicator is a second SLIV.

In some examples, the resource manager 1220 may determine the first starting transmission symbol and the first length indicator based on a first DCI message, and the second starting transmission symbol and the second length indicator based on a second DCI message.

In some examples, the resource manager 1220 may determine that the first transmission symbol overlaps the two or more transmission symbols. In some cases, one or more other UEs transmit feedback information to the base station in the first transmission symbol. In some cases, the resource indicator value provides a mapping to the starting transmission symbol and the length indicator.

The configuration manager 1225 may receive one or more of RRC signaling, a SFI, a specific DCI, or any combinations thereof, that indicates the one or more reserved transmission symbols. In some examples, the configuration manager 1225 may multiple indications of one or more reserved transmission symbols of the uplink slot are provided for different groups of physical resource blocks.

Figure 13:
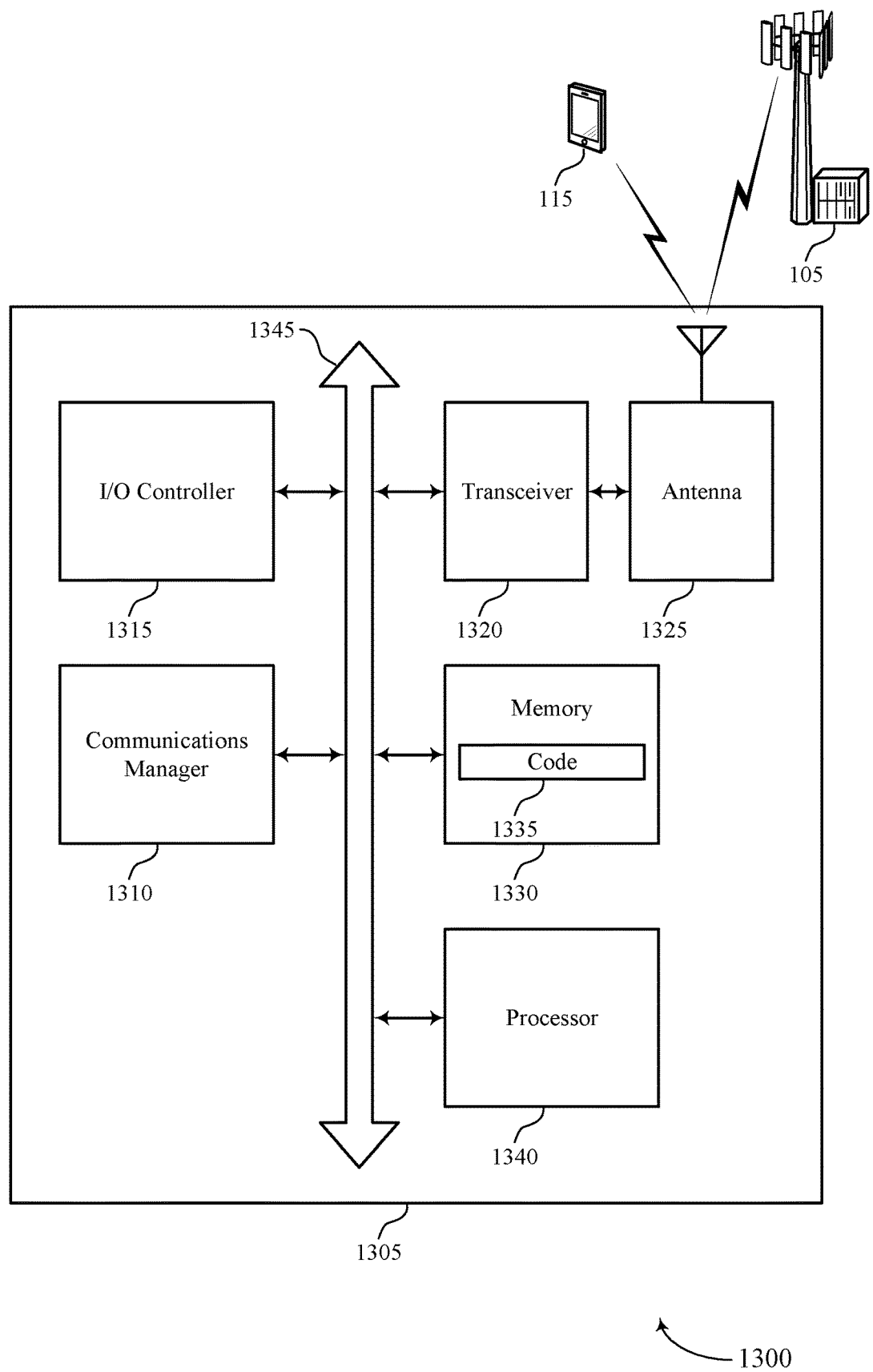
FIG. 13 shows a diagram of a system including a device in accordance with aspects of the present disclosure.

FIG. 13 shows a diagram of a system 1300 including a device 1305 that supports uplink scheduling techniques for enhanced feedback in wireless communications in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may receive a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator, transmit a first portion of the uplink communications using the first starting transmission symbol for a first transmission duration according to the first length indicator, and transmit a second portion of the uplink communications using the second starting transmission symbol for a second transmission duration according to the second length indicator.

The communications manager 1310 may also receive, from a base station, an indication of one or more reserved transmission symbols of an uplink slot, receive a DCI message from the base station that indicates uplink resources in two or more transmission symbols for uplink communications from the UE to the base station, where the two or more transmission symbols overlap at least a first transmission symbol of the one or more reserved transmission symbols, and transmit the uplink communications using the uplink resources, where the transmitting includes skipping the first transmission symbol.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include random access memory (RAM) and read only memory (ROM). The memory 1330 may store computer-readable, computer-executable code 1335 including instructions that, when executed, cause the processor to perform various functions described herein. In some cases, the memory 1330 may contain, among other things, a basic I/O system (BIOS) which may control basic hardware or software operation such as the interaction with peripheral components or devices.

The processor 1340 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting uplink scheduling techniques for enhanced feedback in wireless communications).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
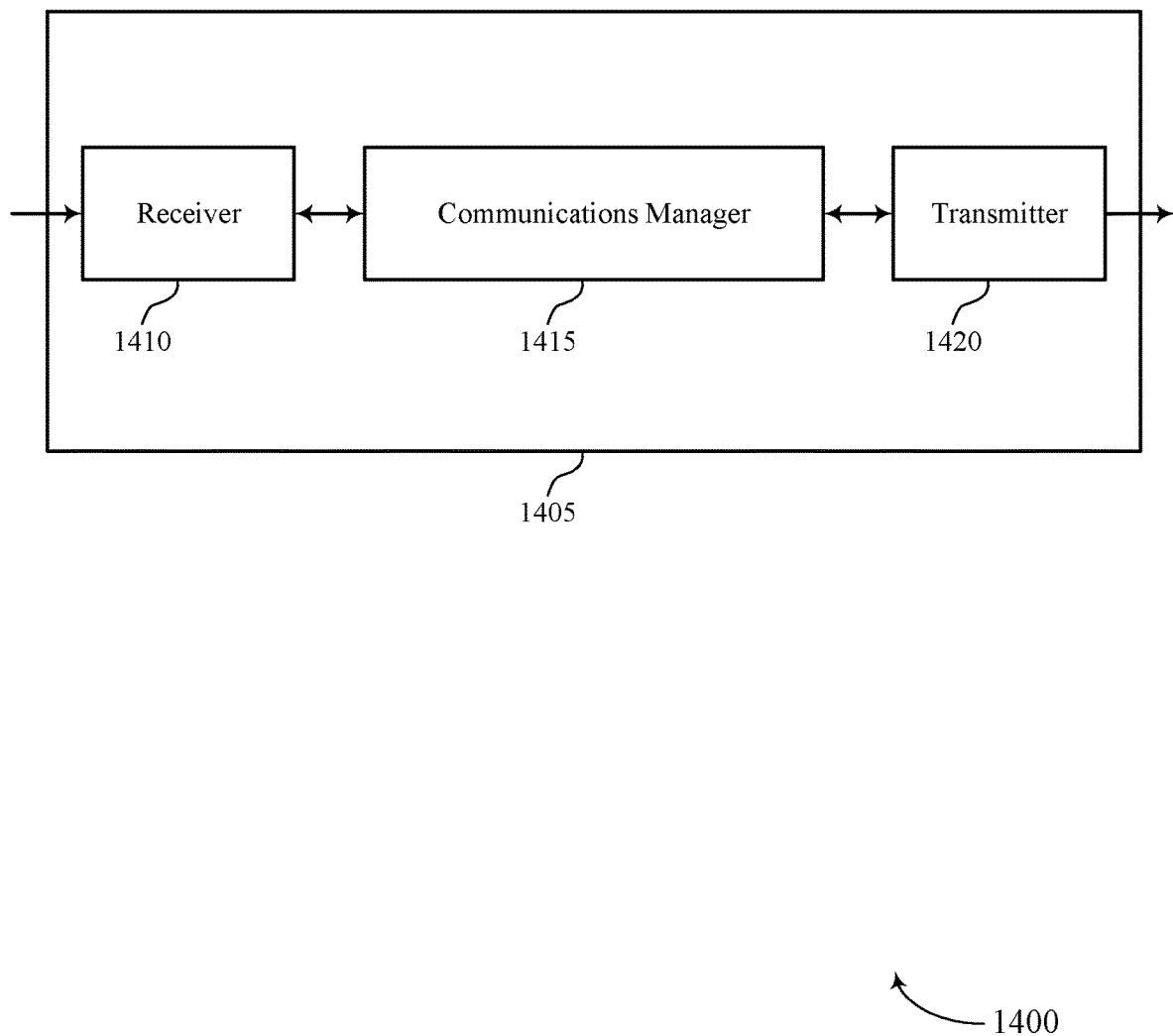
FIGS. 14 and 15 show block diagrams of devices in accordance with aspects of the present disclosure.

FIG. 14 shows a block diagram 1400 of a device 1405 that supports uplink scheduling techniques for enhanced feedback in wireless communications in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to uplink scheduling techniques for enhanced feedback in wireless communications, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may schedule at least a first UE to transmit feedback information to the base station in at least a first uplink transmission symbol, schedule a second UE with uplink resources in two or more uplink transmission symbols for uplink communications from the second UE to the base station, where the two or more uplink transmission symbols span the first uplink transmission symbol, transmit a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol, receive the feedback information from the first UE in the first uplink transmission symbol, and receive the uplink communications from the second UE in the two or more uplink transmission symbols.

The communications manager 1415 may also identify one or more reserved uplink transmission symbols of an uplink slot for feedback transmissions of at least a first UE, transmit, to each of a set of UEs associated with the base station, an indication of the one or more reserved uplink transmission symbols, transmit a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols, receive the uplink communications from the second UE using the uplink resources, where the uplink communications from the second UE skip the first transmission symbol, and receive the feedback transmissions from the first UE in the first transmission symbol. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
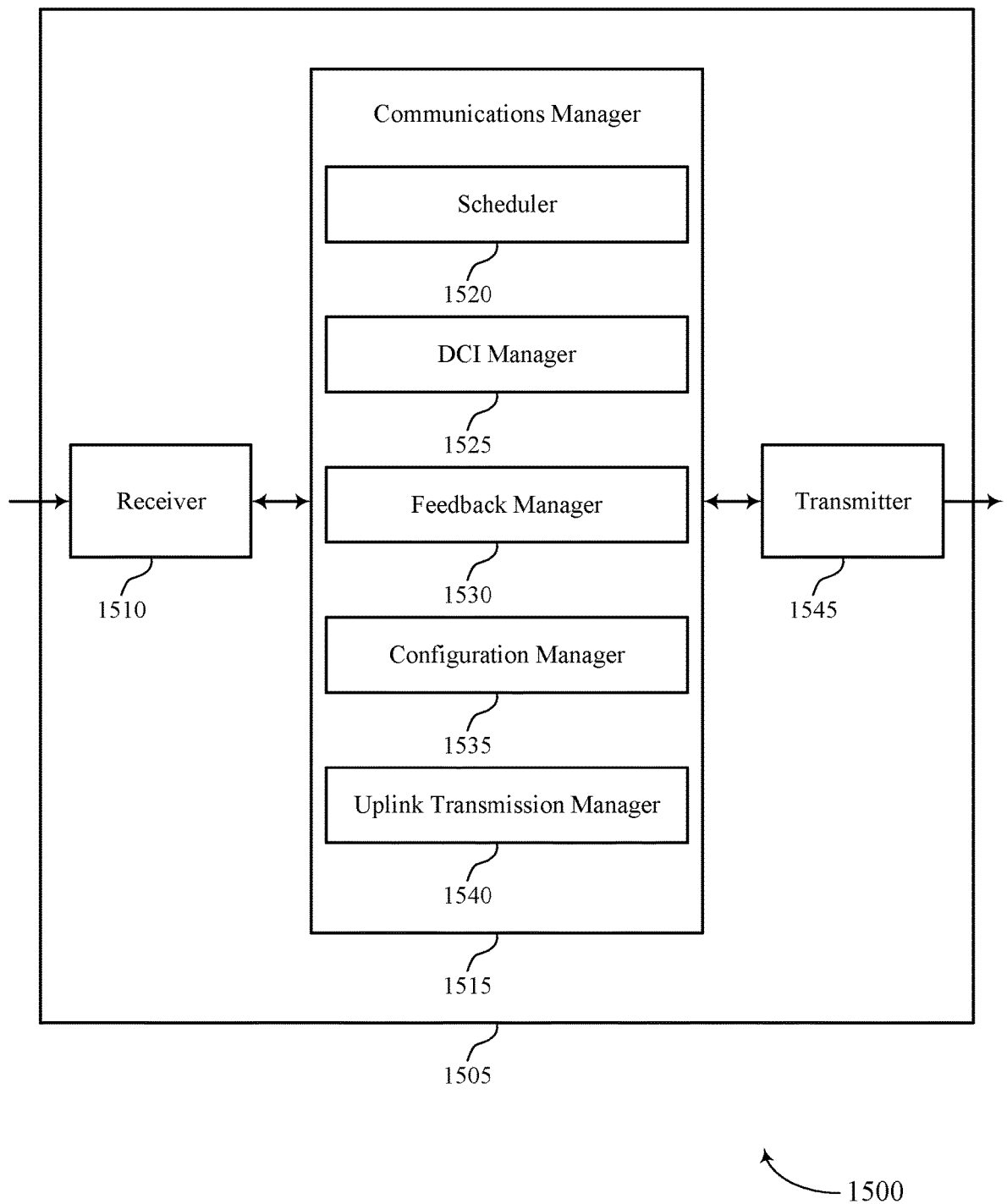

FIG. 15 shows a block diagram 1500 of a device 1505 that supports uplink scheduling techniques for enhanced feedback in wireless communications in accordance with aspects of the present disclosure. The device 1505 may be an example of aspects of a device 1405, or a base station 105 as described herein. The device 1505 may include a receiver 1510, a communications manager 1515, and a transmitter 1545. The device 1505 may also include a processor. Each of these components may be in communication with one another (e.g., via one or more buses).

The receiver 1510 may receive information such as packets, user data, or control information associated with various information channels (e.g., control channels, data channels, and information related to uplink scheduling techniques for enhanced feedback in wireless communications, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a scheduler 1520, a DCI manager 1525, a feedback manager 1530, a configuration manager 1535, and an uplink transmission manager 1540. The communications manager 1515 may be an example of aspects of the communications manager 1710 described herein.

The scheduler 1520 may schedule at least a first UE to transmit feedback information to the base station in at least a first uplink transmission symbol and schedule a second UE with uplink resources in two or more uplink transmission symbols for uplink communications from the second UE to the base station, where the two or more uplink transmission symbols span the first uplink transmission symbol.

The DCI manager 1525 may transmit a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol.

The feedback manager 1530 may receive the feedback information from the first UE in the first uplink transmission symbol and receive the uplink communications from the second UE in the two or more uplink transmission symbols.

In some cases, the scheduler 1520 may identify one or more reserved uplink transmission symbols of an uplink slot for feedback transmissions of at least a first UE. The configuration manager 1535 may transmit, to each of a set of UEs associated with the base station, an indication of the one or more reserved uplink transmission symbols. The DCI manager 1525 may transmit a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols. The uplink transmission manager 1540 may receive the uplink communications from the second UE using the uplink resources, where the uplink communications from the second UE skip the first transmission symbol. The feedback manager 1530 may receive the feedback transmissions from the first UE in the first transmission symbol.

The transmitter 1545 may transmit signals generated by other components of the device 1505. In some examples, the transmitter 1545 may be collocated with a receiver 1510 in a transceiver module. For example, the transmitter 1545 may be an example of aspects of the transceiver 1720 described with reference to FIG. 17. The transmitter 1545 may utilize a single antenna or a set of antennas.

Figure 16:
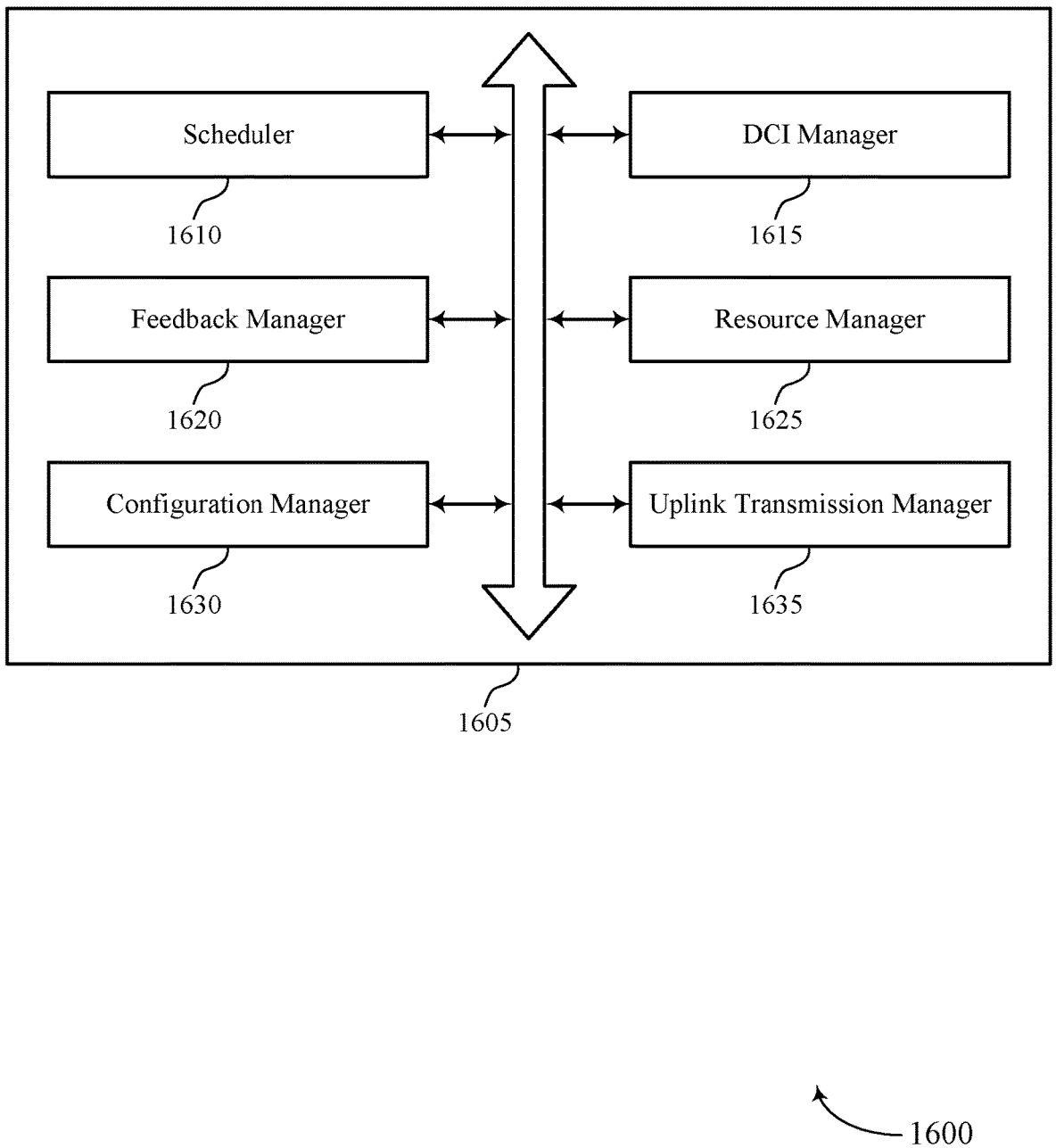
FIG. 16 shows a block diagram of a communications manager in accordance with aspects of the present disclosure.

FIG. 16 shows a block diagram 1600 of a communications manager 1605 that supports uplink scheduling techniques for enhanced feedback in wireless communications in accordance with aspects of the present disclosure. The communications manager 1605 may be an example of aspects of a communications manager 1415, a communications manager 1515, or a communications manager 1710 described herein. The communications manager 1605 may include a scheduler 1610, a DCI manager 1615, a feedback manager 1620, a resource manager 1625, a configuration manager 1630, and an uplink transmission manager 1635. Each of these modules may communicate, directly or indirectly, with one another (e.g., via one or more buses).

The scheduler 1610 may schedule at least a first UE to transmit feedback information to the base station in at least a first uplink transmission symbol. In some examples, the scheduler 1610 may schedule a second UE with uplink resources in two or more uplink transmission symbols for uplink communications from the second UE to the base station, where the two or more uplink transmission symbols span the first uplink transmission symbol.

In some examples, the scheduler 1610 may identify one or more reserved uplink transmission symbols of an uplink slot for feedback transmissions of at least a first UE. In some cases, at least the first uplink transmission symbol separates the first portion of the uplink communications and the second portion of the uplink communications of the second UE.

The DCI manager 1615 may transmit a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol. In some examples, the DCI manager 1615 may transmit a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols.

In some examples, the DCI manager 1615 may transmit a single resource indicator value in the DCI message, and where the first starting transmission symbol, the first length indicator, the second starting transmission symbol, and the second length indicator are determined based on the single resource indicator value.

In some examples, the DCI manager 1615 may transmit a separate DCI message to the first UE that indicates the first UE is to transit feedback information to the base station using the first transmission symbol.

The feedback manager 1620 may receive the feedback information from the first UE in the first uplink transmission symbol. In some examples, the feedback manager 1620 may receive the uplink communications from the second UE in the two or more uplink transmission symbols. In some examples, the feedback manager 1620 may receive the feedback transmissions from the first UE in the first transmission symbol.

The configuration manager 1630 may transmit, to each of a set of UEs associated with the base station, an indication of the one or more reserved uplink transmission symbols. In some examples, the configuration manager 1630 may transmit one or more of RRC signaling, a SFI, or a specific DCI, that indicates the one or more reserved transmission symbols. In some examples, the configuration manager 1630 may provide multiple indications of one or more reserved transmission symbols of the uplink slot are provided for different groups of physical resource blocks.

The uplink transmission manager 1635 may receive the uplink communications from the second UE using the uplink resources, where the uplink communications from the second UE skip the first transmission symbol.

The resource manager 1625 may transmit a resource indicator value in the DCI that indicates the two or more transmission symbols based on a starting transmission symbol and a length indicator provided by the resource indicator value, and where the first transmission symbol overlaps the two or more transmission symbols. In some cases, the single resource indicator value provides a joint mapping to at least a first indicator value that indicates the first starting transmission symbol and the first length indicator, and a second indicator value that indicates the second starting transmission symbol and the second length indicator. In some cases, the single resource indicator value is a weighted sum of a first power applied to a base coordinate multiplied by the first indicator value and a second power applied to the base coordinate multiplied by the second indicator value. In some cases, the base coordinate provides a unique mapping for each of a maximum number of indicators that are mapped to the single resource indicator value. In some cases, the first indicator is a first SLIV and the second indicator is a second SLIV.

In some cases, the resource indicator value provides a mapping to the starting transmission symbol and the length indicator. In some cases, the resource indicator value is a SLIV provided in the DCI.

Figure 17:
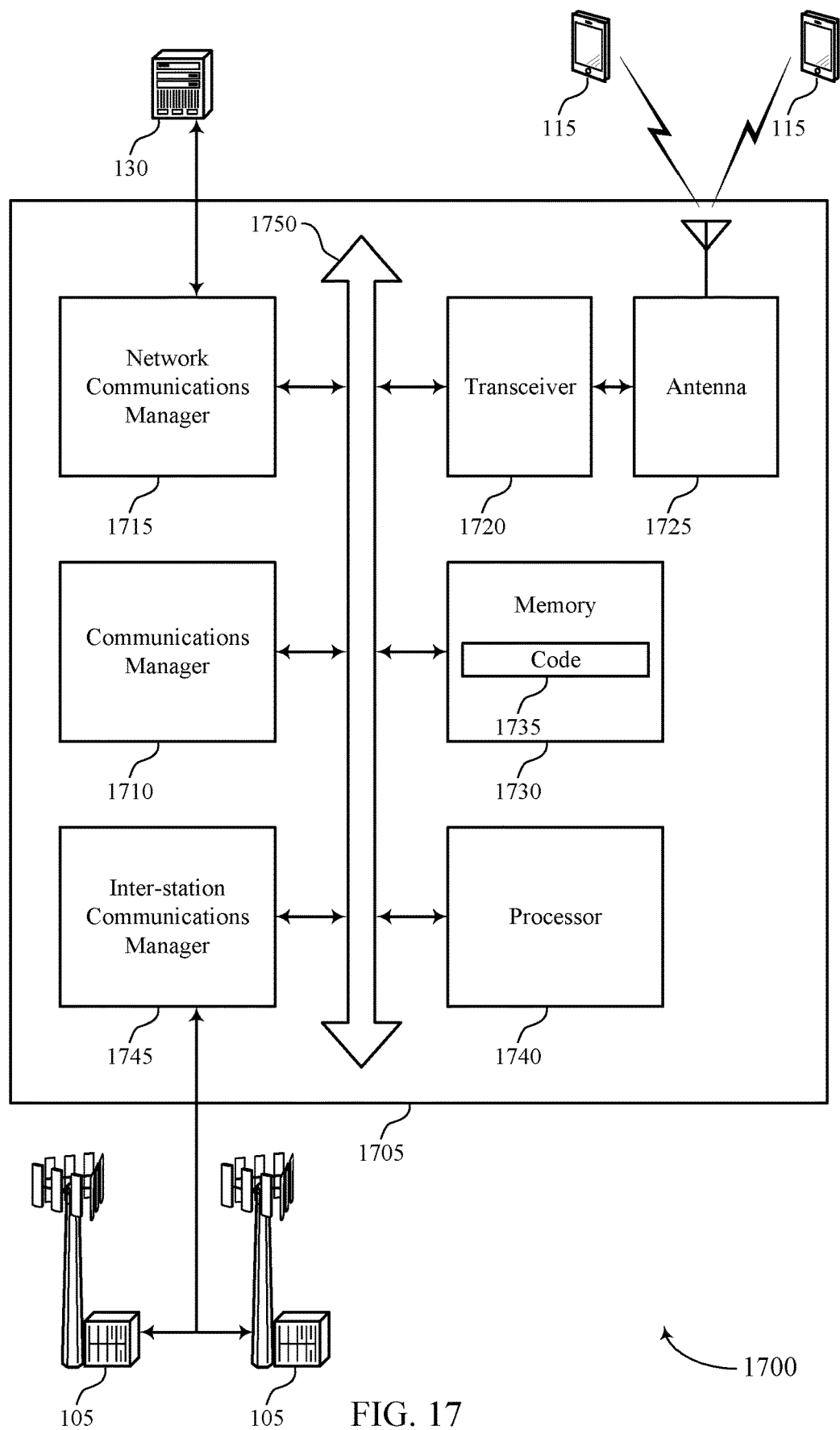
FIG. 17 shows a diagram of a system including a device in accordance with aspects of the present disclosure.

FIG. 17 shows a diagram of a system 1700 including a device 1705 that supports uplink scheduling techniques for enhanced feedback in wireless communications in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may schedule at least a first UE to transmit feedback information to the base station in at least a first uplink transmission symbol, schedule a second UE with uplink resources in two or more uplink transmission symbols for uplink communications from the second UE to the base station, where the two or more uplink transmission symbols span the first uplink transmission symbol, transmit a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol, receive the feedback information from the first UE in the first uplink transmission symbol, and receive the uplink communications from the second UE in the two or more uplink transmission symbols.

The communications manager 1710 may also identify one or more reserved uplink transmission symbols of an uplink slot for feedback transmissions of at least a first UE, transmit, to each of a set of UEs associated with the base station, an indication of the one or more reserved transmission symbols, transmit a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols, receive the uplink communications from the second UE using the uplink resources, where the uplink communications from the second UE skip the first transmission symbol, and receive the feedback transmissions from the first UE in the first transmission symbol.

The network communications manager 1715 may manage communications with the core network 130 (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described herein. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting uplink scheduling techniques for enhanced feedback in wireless communications).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
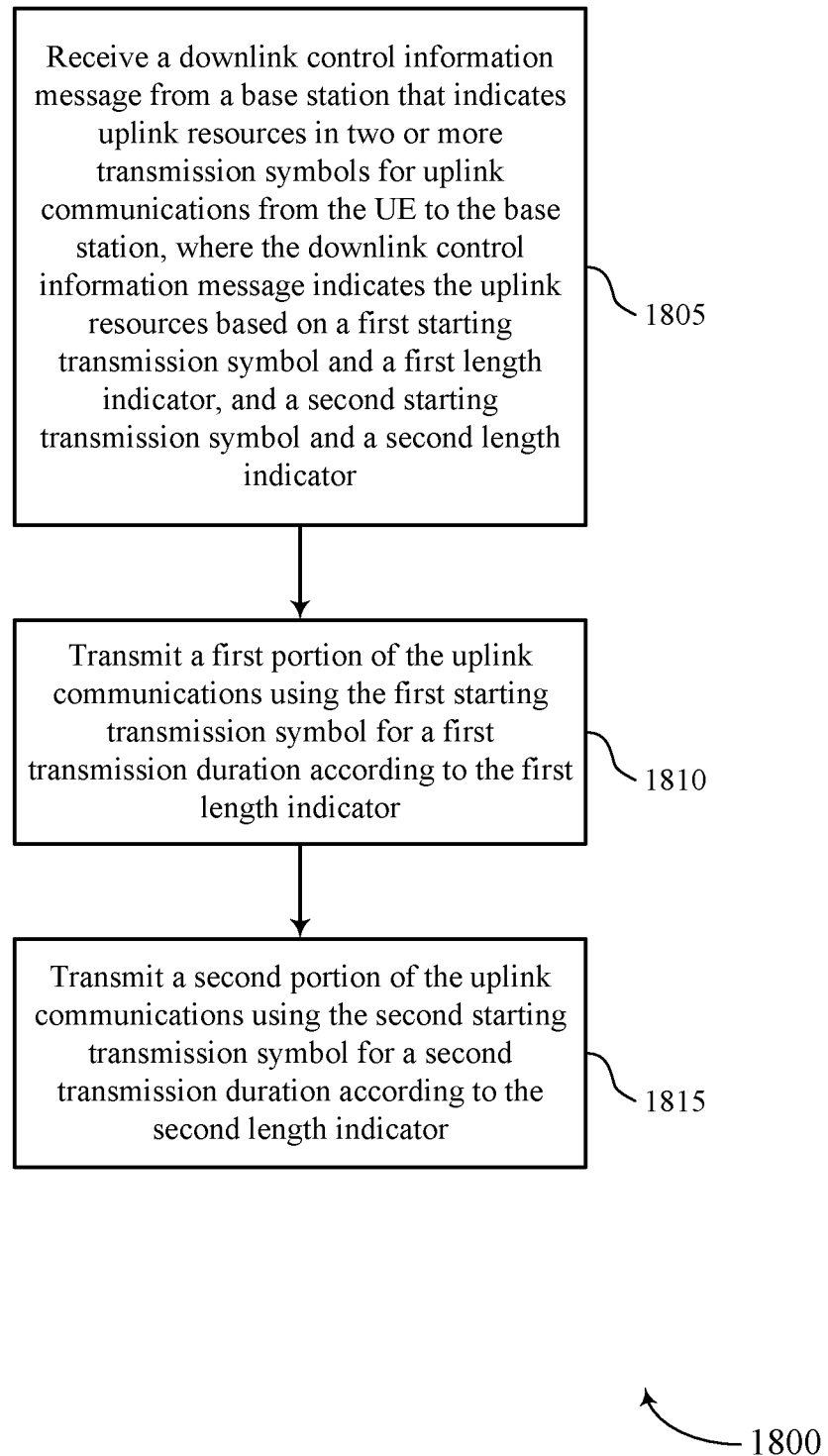
FIGS. 18 through 24 show flowcharts illustrating methods in accordance with aspects of the present disclosure.

FIG. 18 shows a flowchart illustrating a method 1800 that supports uplink scheduling techniques for enhanced feedback in wireless communications in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1805, the UE may receive a DCI message from a base station that indicates uplink resources in two or more transmission symbols for uplink communications from the UE to the base station, where the DCI message indicates the uplink resources based on a first starting transmission symbol and a first length indicator, and a second starting transmission symbol and a second length indicator. The operations of 1805 may be performed according to the methods described herein. In some examples, aspects of the operations of 1805 may be performed by a DCI manager as described with reference to FIGS. 10 through 13.

At 1810, the UE may transmit a first portion of the uplink communications using the first starting transmission symbol for a first transmission duration according to the first length indicator. The operations of 1810 may be performed according to the methods described herein. In some examples, aspects of the operations of 1810 may be performed by an uplink transmission manager as described with reference to FIGS. 10 through 13.

At 1815, the UE may transmit a second portion of the uplink communications using the second starting transmission symbol for a second transmission duration according to the second length indicator. The operations of 1815 may be performed according to the methods described herein. In some examples, aspects of the operations of 1815 may be performed by an uplink transmission manager as described with reference to FIGS. 10 through 13.

Figure 19:
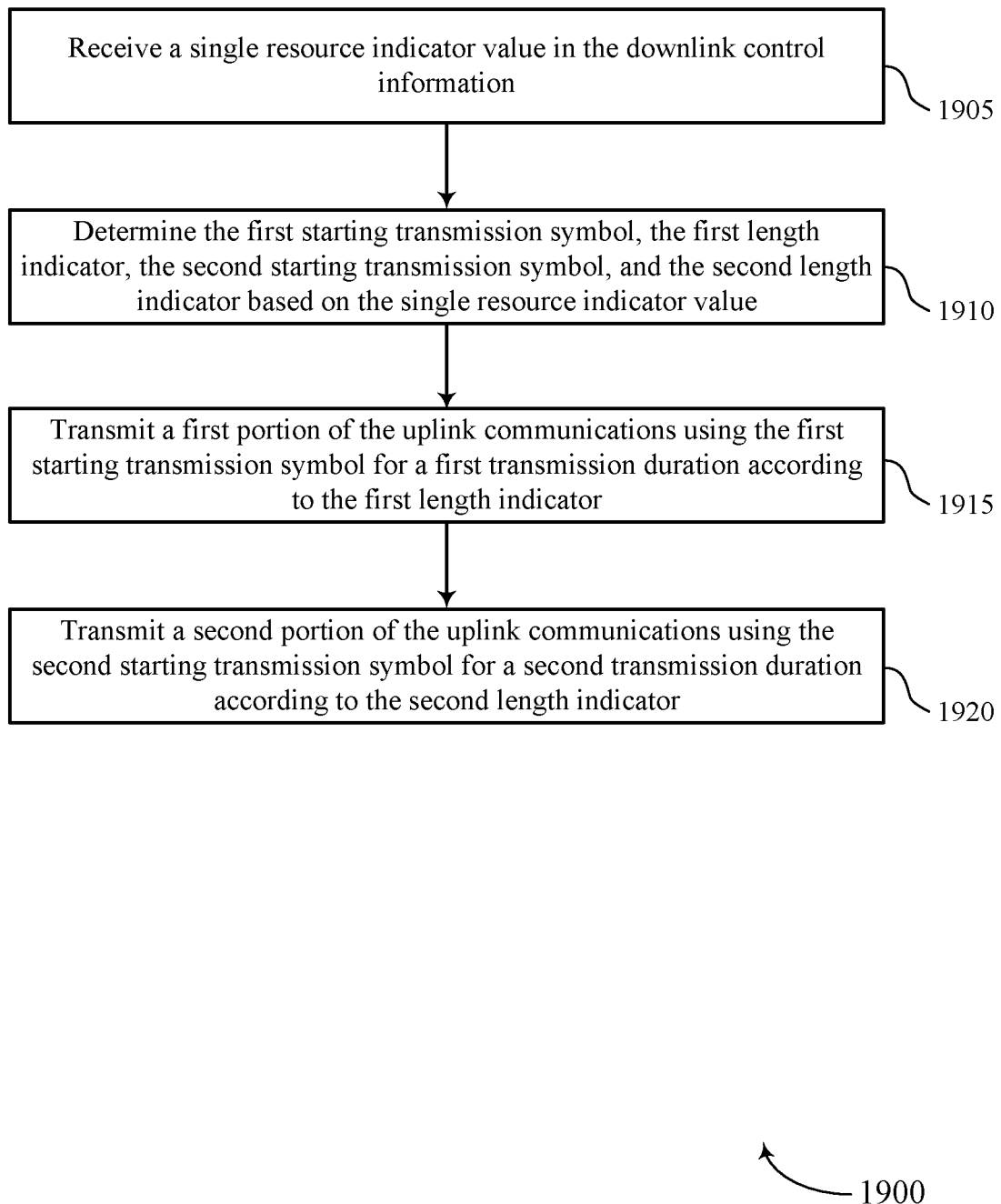

FIG. 19 shows a flowchart illustrating a method 1900 that supports uplink scheduling techniques for enhanced feedback in wireless communications in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 1905, the UE may receive a single resource indicator value in the DCI. The operations of 1905 may be performed according to the methods described herein. In some examples, aspects of the operations of 1905 may be performed by a DCI manager as described with reference to FIGS. 10 through 13.

At 1910, the UE may determine the first starting transmission symbol, the first length indicator, the second starting transmission symbol, and the second length indicator based on the single resource indicator value. The operations of 1910 may be performed according to the methods described herein. In some examples, aspects of the operations of 1910 may be performed by a resource manager as described with reference to FIGS. 10 through 13. In some cases, the UE may the single resource indicator value provides a joint mapping to at least a first indicator value that indicates the first starting transmission symbol and the first length indicator, and a second indicator value that indicates the second starting transmission symbol and the second length indicator. In some cases, the single resource indicator value is a weighted sum of a first power applied to a base coordinate multiplied by the first indicator value and a second power applied to the base coordinate multiplied by the second indicator value. In some cases, the base coordinate provides a unique mapping for each of a maximum number of indicators that are mapped to the single resource indicator value.

At 1915, the UE may transmit a first portion of the uplink communications using the first starting transmission symbol for a first transmission duration according to the first length indicator. The operations of 1915 may be performed according to the methods described herein. In some examples, aspects of the operations of 1915 may be performed by an uplink transmission manager as described with reference to FIGS. 10 through 13.

At 1920, the UE may transmit a second portion of the uplink communications using the second starting transmission symbol for a second transmission duration according to the second length indicator. The operations of 1920 may be performed according to the methods described herein. In some examples, aspects of the operations of 1920 may be performed by an uplink transmission manager as described with reference to FIGS. 10 through 13.

Figure 20:
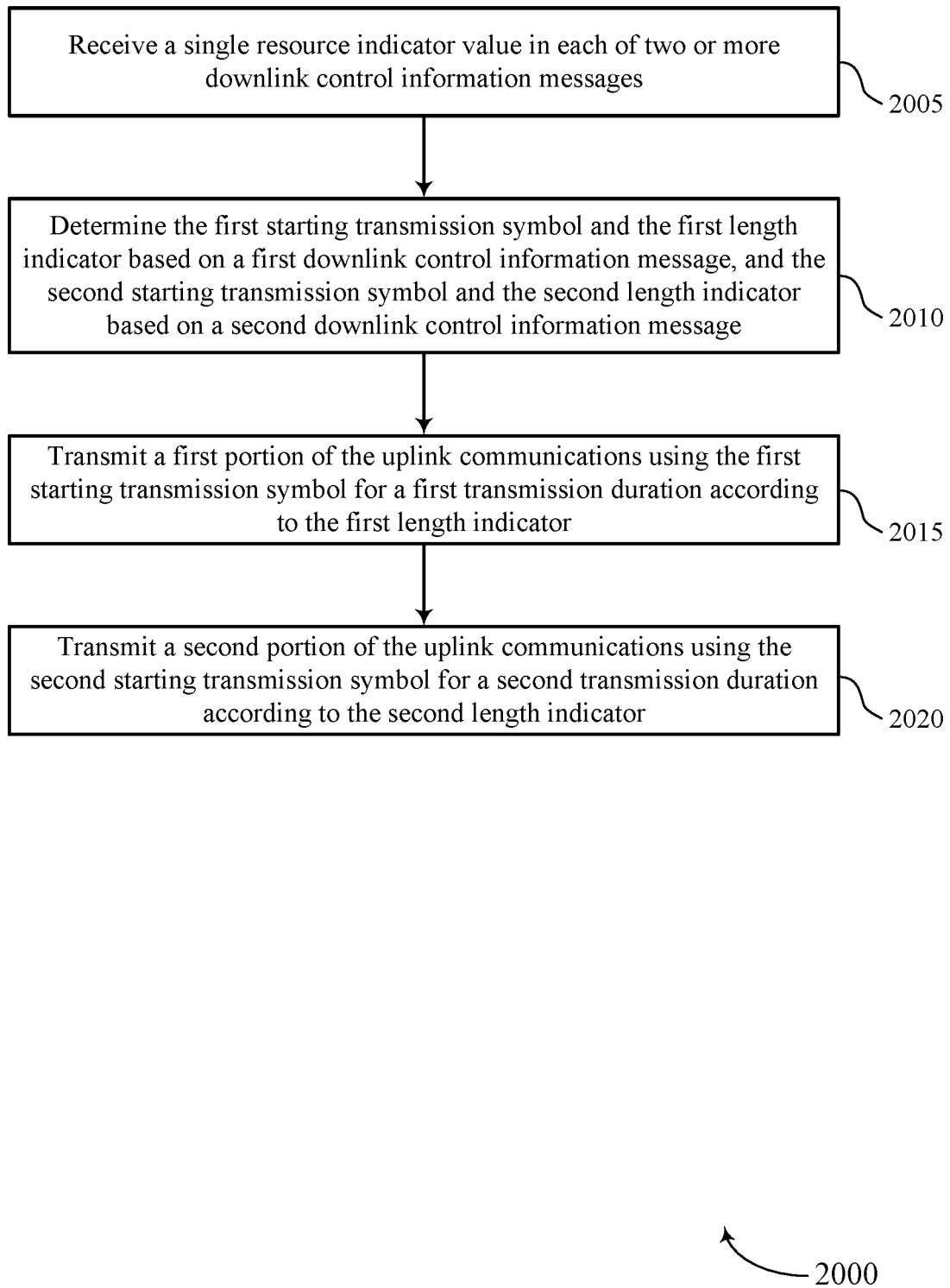

FIG. 20 shows a flowchart illustrating a method 2000 that supports uplink scheduling techniques for enhanced feedback in wireless communications in accordance with aspects of the present disclosure. The operations of method 2000 may be implemented by a UE 115 or its components as described herein. For example, the operations of method 2000 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 2005, the UE may receive a single resource indicator value in each of two or more DCI messages. The operations of 2005 may be performed according to the methods described herein. In some examples, aspects of the operations of 2005 may be performed by a DCI manager as described with reference to FIGS. 10 through 13.

At 2010, the UE may determine the first starting transmission symbol and the first length indicator based on a first DCI message, and the second starting transmission symbol and the second length indicator based on a second DCI message. The operations of 2010 may be performed according to the methods described herein. In some examples, aspects of the operations of 2010 may be performed by a resource manager as described with reference to FIGS. 10 through 13.

At 2015, the UE may transmit a first portion of the uplink communications using the first starting transmission symbol for a first transmission duration according to the first length indicator. The operations of 2015 may be performed according to the methods described herein. In some examples, aspects of the operations of 2015 may be performed by an uplink transmission manager as described with reference to FIGS. 10 through 13.

At 2020, the UE may transmit a second portion of the uplink communications using the second starting transmission symbol for a second transmission duration according to the second length indicator. The operations of 2020 may be performed according to the methods described herein. In some examples, aspects of the operations of 2020 may be performed by an uplink transmission manager as described with reference to FIGS. 10 through 13.

Figure 21:
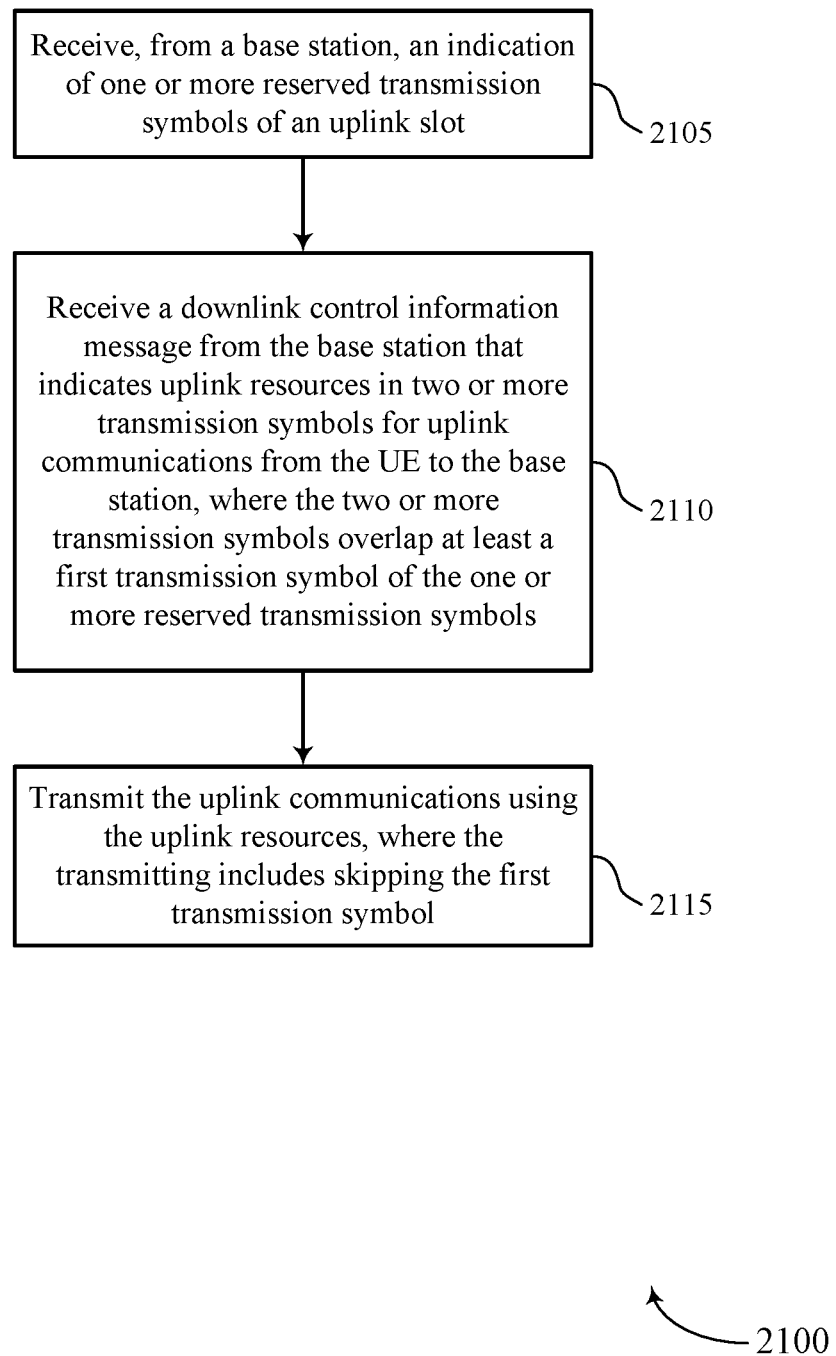

FIG. 21 shows a flowchart illustrating a method 2100 that supports uplink scheduling techniques for enhanced feedback in wireless communications in accordance with aspects of the present disclosure. The operations of method 2100 may be implemented by a UE 115 or its components as described herein. For example, the operations of method 2100 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 2105, the UE may receive, from a base station, an indication of one or more reserved transmission symbols of an uplink slot. The operations of 2105 may be performed according to the methods described herein. In some examples, aspects of the operations of 2105 may be performed by a resource manager as described with reference to FIGS. 10 through 13.

At 2110, the UE may receive a DCI message from the base station that indicates uplink resources in two or more transmission symbols for uplink communications from the UE to the base station, where the two or more transmission symbols overlap at least a first transmission symbol of the one or more reserved transmission symbols. The operations of 2110 may be performed according to the methods described herein. In some examples, aspects of the operations of 2110 may be performed by a DCI manager as described with reference to FIGS. 10 through 13.

At 2115, the UE may transmit the uplink communications using the uplink resources, where the transmitting includes skipping the first transmission symbol. The operations of 2115 may be performed according to the methods described herein. In some examples, aspects of the operations of 2115 may be performed by an uplink transmission manager as described with reference to FIGS. 10 through 13.

Figure 22:
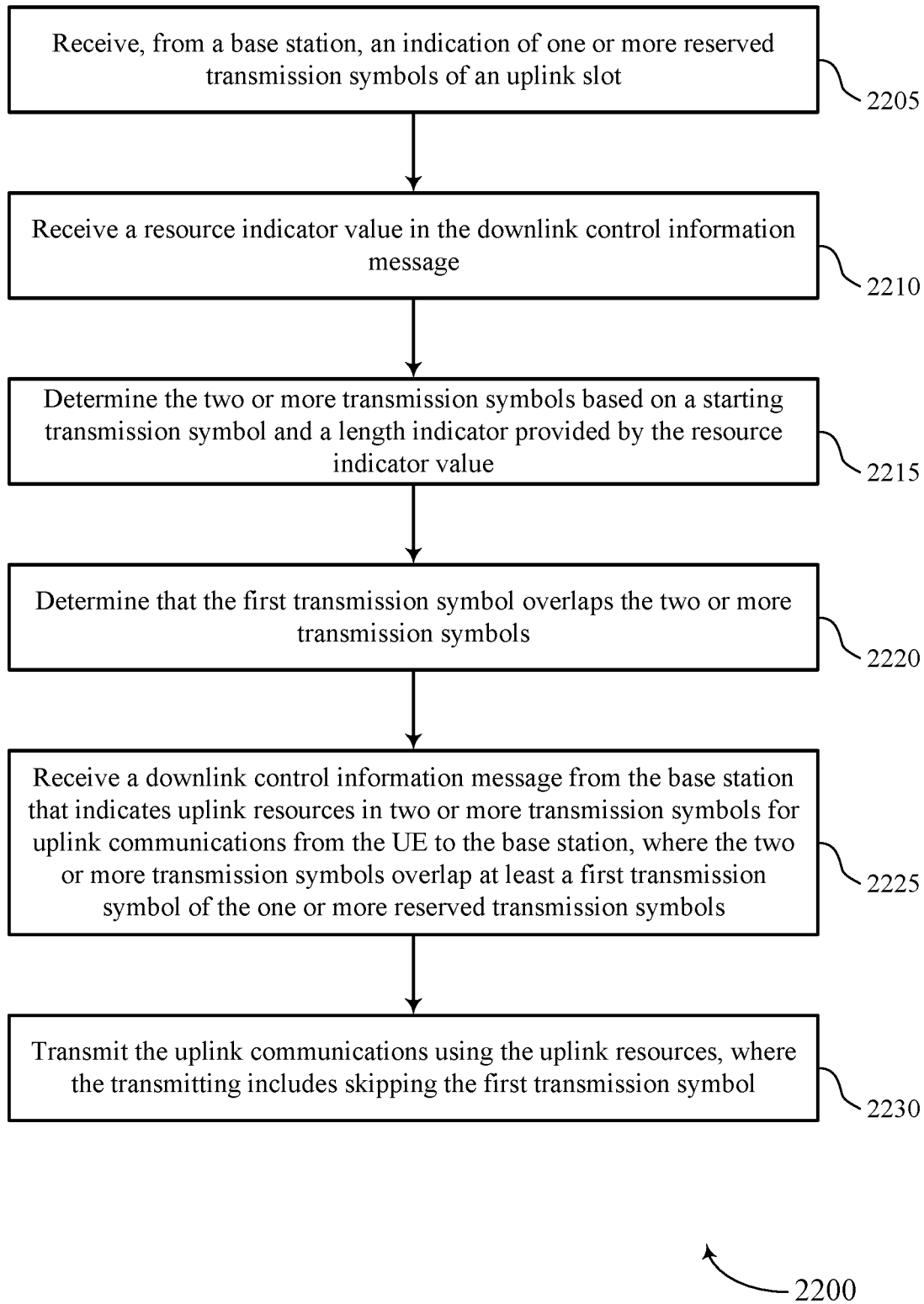

FIG. 22 shows a flowchart illustrating a method 2200 that supports uplink scheduling techniques for enhanced feedback in wireless communications in accordance with aspects of the present disclosure. The operations of method 2200 may be implemented by a UE 115 or its components as described herein. For example, the operations of method 2200 may be performed by a communications manager as described with reference to FIGS. 10 through 13. In some examples, a UE may execute a set of instructions to control the functional elements of the UE to perform the functions described herein. Additionally or alternatively, a UE may perform aspects of the functions described herein using special-purpose hardware.

At 2205, the UE may receive, from a base station, an indication of one or more reserved transmission symbols of an uplink slot. The operations of 2205 may be performed according to the methods described herein. In some examples, aspects of the operations of 2205 may be performed by a resource manager as described with reference to FIGS. 10 through 13.

At 2210, the UE may receive a resource indicator value in the DCI message. The operations of 2210 may be performed according to the methods described herein. In some examples, aspects of the operations of 2210 may be performed by a DCI manager as described with reference to FIGS. 10 through 13.

At 2215, the UE may determine the two or more transmission symbols based on a starting transmission symbol and a length indicator provided by the resource indicator value. The operations of 2215 may be performed according to the methods described herein. In some examples, aspects of the operations of 2215 may be performed by a resource manager as described with reference to FIGS. 10 through 13.

At 2220, the UE may determine that the first transmission symbol overlaps the two or more transmission symbols. The operations of 2220 may be performed according to the methods described herein. In some examples, aspects of the operations of 2220 may be performed by a resource manager as described with reference to FIGS. 10 through 13.

At 2225, the UE may receive a DCI message from the base station that indicates uplink resources in two or more transmission symbols for uplink communications from the UE to the base station, where the two or more transmission symbols overlap at least a first transmission symbol of the one or more reserved transmission symbols. The operations of 2225 may be performed according to the methods described herein. In some examples, aspects of the operations of 2225 may be performed by a DCI manager as described with reference to FIGS. 10 through 13.

At 2230, the UE may transmit the uplink communications using the uplink resources, where the transmitting includes skipping the first transmission symbol. The operations of 2230 may be performed according to the methods described herein. In some examples, aspects of the operations of 2230 may be performed by an uplink transmission manager as described with reference to FIGS. 10 through 13.

Figure 23:
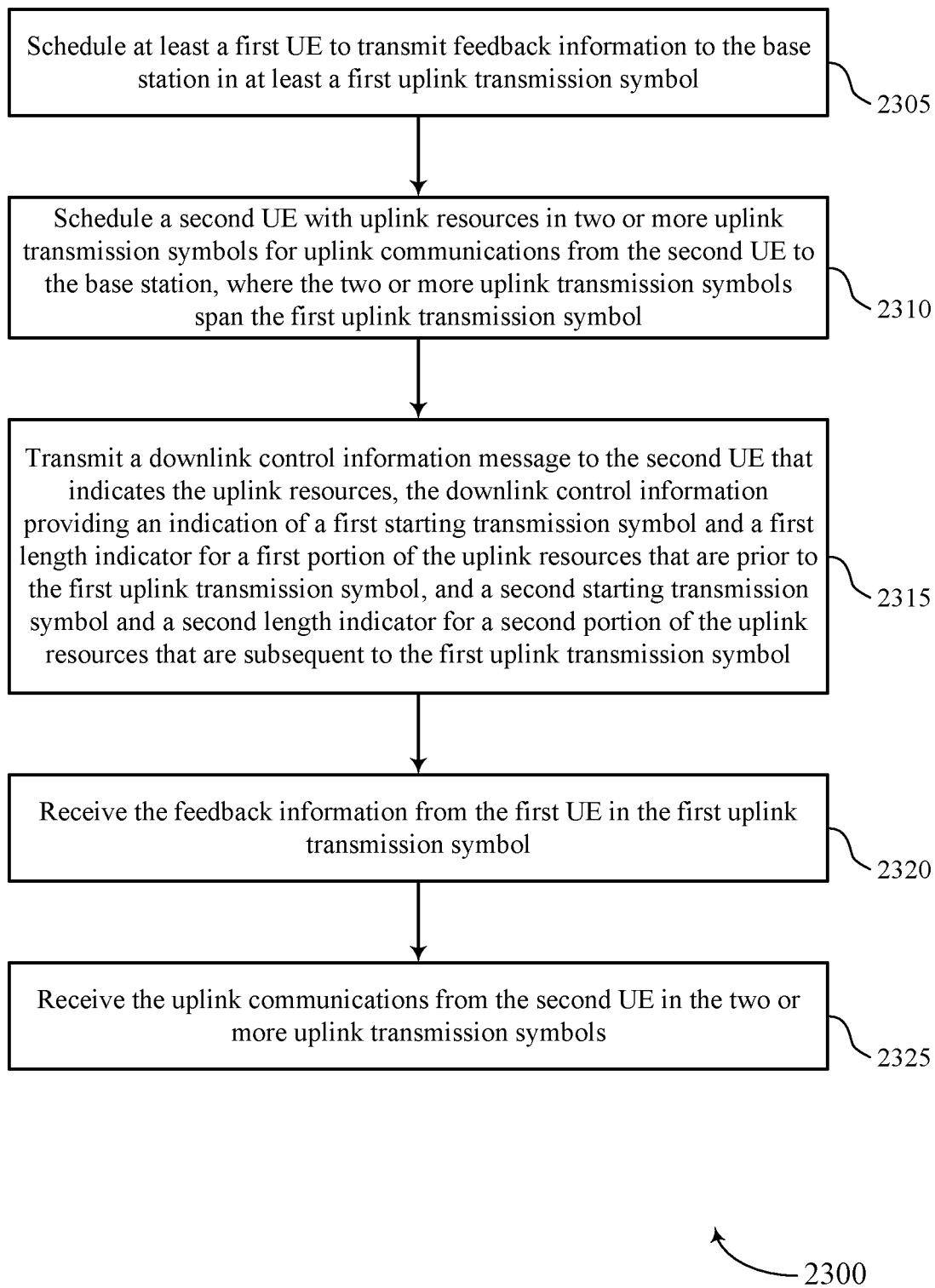

FIG. 23 shows a flowchart illustrating a method 2300 that supports uplink scheduling techniques for enhanced feedback in wireless communications in accordance with aspects of the present disclosure. The operations of method 2300 may be implemented by a base station 105 or its components as described herein. For example, the operations of method 2300 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2305, the base station may schedule at least a first UE to transmit feedback information to the base station in at least a first uplink transmission symbol. The operations of 2305 may be performed according to the methods described herein. In some examples, aspects of the operations of 2305 may be performed by a scheduler as described with reference to FIGS. 14 through 17.

At 2310, the base station may schedule a second UE with uplink resources in two or more uplink transmission symbols for uplink communications from the second UE to the base station, where the two or more uplink transmission symbols span the first uplink transmission symbol. The operations of 2310 may be performed according to the methods described herein. In some examples, aspects of the operations of 2310 may be performed by a scheduler as described with reference to FIGS. 14 through 17.

At 2315, the base station may transmit a DCI message to the second UE that indicates the uplink resources, the DCI providing an indication of a first starting transmission symbol and a first length indicator for a first portion of the uplink resources that are prior to the first uplink transmission symbol, and a second starting transmission symbol and a second length indicator for a second portion of the uplink resources that are subsequent to the first uplink transmission symbol. The operations of 2315 may be performed according to the methods described herein. In some examples, aspects of the operations of 2315 may be performed by a DCI manager as described with reference to FIGS. 14 through 17.

At 2320, the base station may receive the feedback information from the first UE in the first uplink transmission symbol. The operations of 2320 may be performed according to the methods described herein. In some examples, aspects of the operations of 2320 may be performed by a feedback manager as described with reference to FIGS. 14 through 17.

At 2325, the base station may receive the uplink communications from the second UE in the two or more uplink transmission symbols. The operations of 2325 may be performed according to the methods described herein. In some examples, aspects of the operations of 2325 may be performed by a feedback manager as described with reference to FIGS. 14 through 17.

Figure 24:
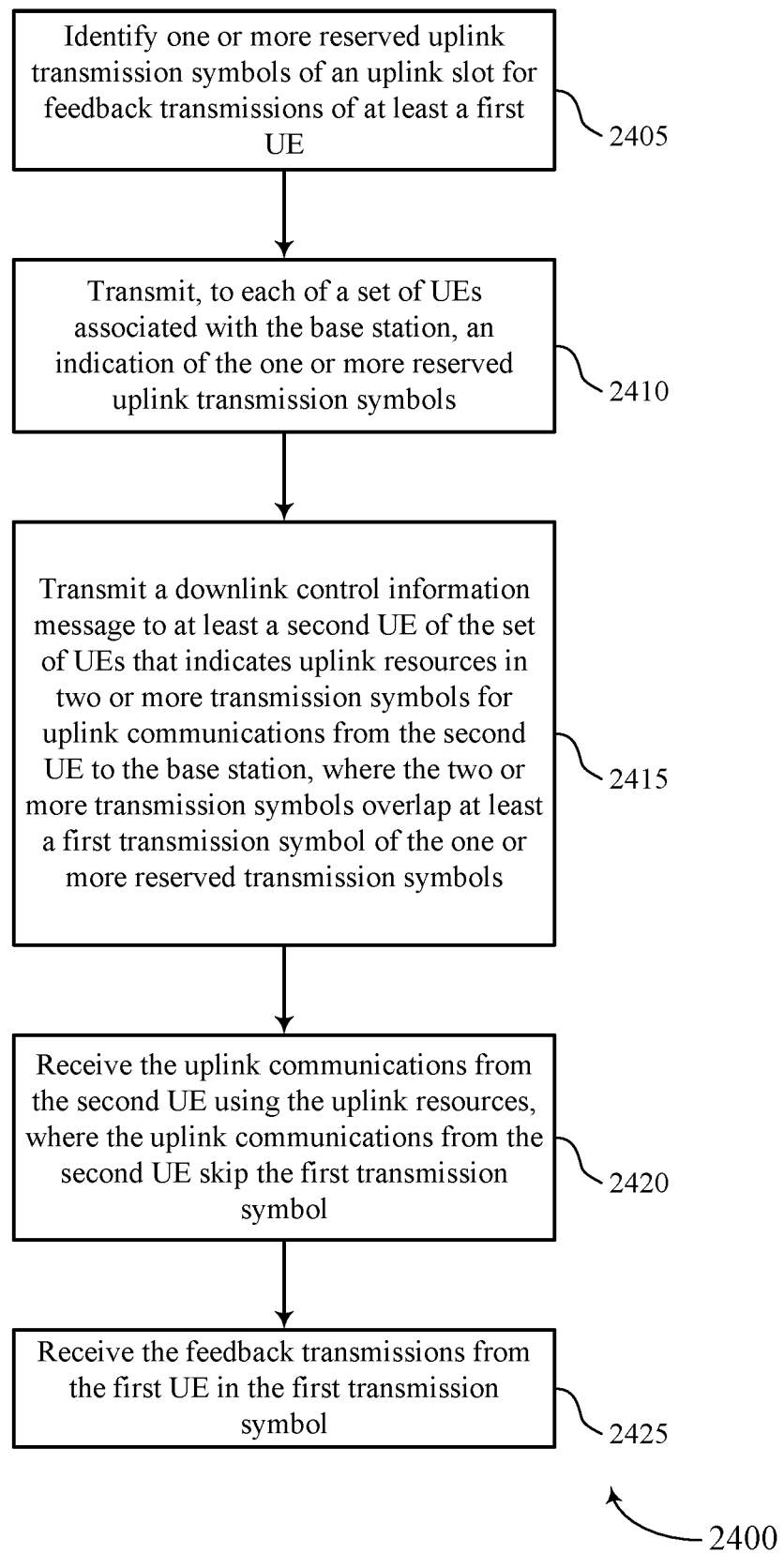

FIG. 24 shows a flowchart illustrating a method 2400 that supports uplink scheduling techniques for enhanced feedback in wireless communications in accordance with aspects of the present disclosure. The operations of method 2400 may be implemented by a base station 105 or its components as described herein. For example, the operations of method 2400 may be performed by a communications manager as described with reference to FIGS. 14 through 17. In some examples, a base station may execute a set of instructions to control the functional elements of the base station to perform the functions described herein. Additionally or alternatively, a base station may perform aspects of the functions described herein using special-purpose hardware.

At 2405, the base station may identify one or more reserved uplink transmission symbols of an uplink slot for feedback transmissions of at least a first UE. The operations of 2405 may be performed according to the methods described herein. In some examples, aspects of the operations of 2405 may be performed by a scheduler as described with reference to FIGS. 14 through 17.

At 2410, the base station may transmit, to each of a set of UEs associated with the base station, an indication of the one or more reserved uplink transmission symbols. The operations of 2410 may be performed according to the methods described herein. In some examples, aspects of the operations of 2410 may be performed by a configuration manager as described with reference to FIGS. 14 through 17.

At 2415, the base station may transmit a DCI message to at least a second UE of the set of UEs that indicates uplink resources in two or more transmission symbols for uplink communications from the second UE to the base station, where the two or more transmission symbols overlap at least a first transmission symbol of the one or more reserved transmission symbols. The operations of 2415 may be performed according to the methods described herein. In some examples, aspects of the operations of 2415 may be performed by a DCI manager as described with reference to FIGS. 14 through 17.

At 2420, the base station may receive the uplink communications from the second UE using the uplink resources, where the uplink communications from the second UE skip the first transmission symbol. The operations of 2420 may be performed according to the methods described herein. In some examples, aspects of the operations of 2420 may be performed by an uplink transmission manager as described with reference to FIGS. 14 through 17.

At 2425, the base station may receive the feedback transmissions from the first UE in the first transmission symbol. The operations of 2425 may be performed according to the methods described herein. In some examples, aspects of the operations of 2425 may be performed by a feedback manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations herein are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving a downlink control information message from a network device that indicates uplink resources in two or more transmission symbols for uplink communications from the UE to the network device, wherein the downlink control information message indicates the uplink resources based at least in part on a single resource indicator value received in the downlink control information message that provides a joint mapping to at least a first indicator value that indicates a first starting transmission symbol and a first length indicator, and a second indicator value that indicates a second starting transmission symbol and a second length indicator, the single resource indicator value being a weighted sum of a first power applied to a base coordinate multiplied by the first indicator value and a second power applied to the base coordinate multiplied by the second indicator value;
   transmitting a first portion of the uplink communications using the first starting transmission symbol for a first transmission duration according to the first length indicator; and
   transmitting a second portion of the uplink communications using the second starting transmission symbol for a second transmission duration according to the second length indicator.

2. The method of claim 1, wherein at least a first transmission symbol separates the first portion of the uplink communications and the second portion of the uplink communications, and wherein one or more other UEs transmit feedback information to the network device in the first transmission symbol.

3. The method of claim 1, wherein the base coordinate provides a unique mapping for each of a maximum number of indicators that are mapped to the single resource indicator value.

4. The method of claim 1, wherein the first indicator value is a first start and length indicator value (SLIV) and the second indicator value is a second SLIV.

5. An apparatus for wireless communication at a user equipment (UE), comprising:
   a processor,
   memory coupled with the processor; and
   instructions stored in the memory and executable by the processor to cause the apparatus to:
      receive a downlink control information message from a network device that indicates uplink resources in two or more transmission symbols for uplink communications from the UE to the network device, wherein the downlink control information message indicates the uplink resources based at least in part on a single resource indicator value received in the downlink control information message that provides a joint mapping to at least a first indicator value that indicates a first starting transmission symbol and a first length indicator, and a second indicator value that indicates a second starting transmission symbol and a second length indicator, the single resource indicator value being a weighted sum of a first power applied to a base coordinate multiplied by the first indicator value and a second power applied to the base coordinate multiplied by the second indicator value;
      transmit a first portion of the uplink communications using the first starting transmission symbol for a first transmission duration according to the first length indicator; and transmit a second portion of the uplink communications using the second starting transmission symbol for a second transmission duration according to the second length indicator.

6. The apparatus of claim 5, wherein at least a first transmission symbol separates the first portion of the uplink communications and the second portion of the uplink communications, and wherein one or more other UEs transmit feedback information to the network device in the first transmission symbol.

7. The apparatus of claim 5, wherein the base coordinate provides a unique mapping for each of a maximum number of indicators that are mapped to the single resource indicator value.

8. The apparatus of claim 5, wherein the first indicator value is a first start and length indicator value (SLIV) and the second indicator value is a second SLIV.

9. An apparatus for wireless communication at a user equipment (UE), comprising:
means for receiving a downlink control information message from a network device that indicates uplink resources in two or more transmission symbols for uplink communications from the UE to the network device, wherein the downlink control information message indicates the uplink resources based at least in part on a single resource indicator value received in the downlink control information message that provides a joint mapping to at least a first indicator value that indicates a first starting transmission symbol and a first length indicator, and a second indicator value that indicates a second starting transmission symbol and a second length indicator, the single resource indicator value being a weighted sum of a first power applied to a base coordinate multiplied by the first indicator value and a second power applied to the base coordinate multiplied by the second indicator value;
means for transmitting a first portion of the uplink communications using the first starting transmission symbol for a first transmission duration according to the first length indicator; and
means for transmitting a second portion of the uplink communications using the second starting transmission symbol for a second transmission duration according to the second length indicator.

10. The apparatus of claim 9, wherein at least a first transmission symbol separates the first portion of the uplink communications and the second portion of the uplink communications, and wherein one or more other UEs transmit feedback information to the network device in the first transmission symbol.

11. The apparatus of claim 9, wherein the base coordinate provides a unique mapping for each of a maximum number of indicators that are mapped to the single resource indicator value.

12. The apparatus of claim 9, wherein the first indicator value is a first start and length indicator value (SLIV) and the second indicator value is a second SLIV.

13. A non-transitory computer-readable medium storing code for wireless communications at a user equipment (UE), the code comprising instructions executable by a processor to:
receive a downlink control information message from a network device that indicates uplink resources in two or more transmission symbols for uplink communications from the UE to the network device, wherein the downlink control information message indicates the uplink resources based at least in part on a single resource indicator value received in the downlink control information message that provides a joint mapping to at least a first indicator value that indicates a first starting transmission symbol and a first length indicator, and a second indicator value that indicates a second starting transmission symbol and a second length indicator, the single resource indicator value being a weighted sum of a first power applied to a base coordinate multiplied by the first indicator value and a second power applied to the base coordinate multiplied by the second indicator value;
transmit a first portion of the uplink communications using the first starting transmission symbol for a first transmission duration according to the first length indicator; and
transmit a second portion of the uplink communications using the second starting transmission symbol for a second transmission duration according to the second length indicator.

14. The non-transitory computer-readable medium of claim 13, wherein at least a first transmission symbol separates the first portion of the uplink communications and the second portion of the uplink communications, and wherein one or more other UEs transmit feedback information to the network device in the first transmission symbol.

15. The non-transitory computer-readable medium of claim 13, wherein the base coordinate provides a unique mapping for each of a maximum number of indicators that are mapped to the single resource indicator value.

16. The non-transitory computer-readable medium of claim 13, wherein the first indicator value is a first start and length indicator value (SLIV) and the second indicator value is a second SLIV.

* * * * *